(12) United States Patent
Zheng et al.

(10) Patent No.: US 11,662,810 B2
(45) Date of Patent: May 30, 2023

(54) ENHANCED EYE TRACKING TECHNIQUES BASED ON NEURAL NETWORK ANALYSIS OF IMAGES

(71) Applicant: Magic Leap, Inc., Plantation, FL (US)

(72) Inventors: Hao Zheng, Weston, FL (US); Zhiheng Jia, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 209 days.

(21) Appl. No.: 17/333,843

(22) Filed: May 28, 2021

(65) Prior Publication Data

US 2021/0382549 A1 Dec. 9, 2021

Related U.S. Application Data

(60) Provisional application No. 63/035,290, filed on Jun. 5, 2020.

(51) Int. Cl.
*G06F 3/01* (2006.01)
*G06T 5/00* (2006.01)

(52) U.S. Cl.
CPC .............. *G06F 3/013* (2013.01); *G06T 5/009* (2013.01); *G06T 2207/10048* (2013.01); *G06T 2207/20081* (2013.01); *G06T 2207/20084* (2013.01)

(58) Field of Classification Search
CPC .......... G06F 3/013; G06F 3/011; G06T 5/009; G06T 2207/10048; G06T 2207/20081; G06T 2207/20084; G06T 2207/30041; G06N 3/045; G06N 3/088; G06N 3/084; H04N 23/741
See application file for complete search history.

(56) References Cited

U.S. PATENT DOCUMENTS

| | | | |
|---|---|---|---|
| 6,850,221 B1 | 2/2005 | Tickle | |
| 11,315,288 B2 * | 4/2022 | Farmer | .................. G06F 3/012 |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2012/0201456 A1 | 8/2012 | El-Mahdy et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |

(Continued)

OTHER PUBLICATIONS

Chennamma, H. R., and Xiaohui Yuan. "A survey on eye-gaze tracking techniques." arXiv preprint arXiv:1312.6410 (2013). (Year: 2103).*

(Continued)

*Primary Examiner* — Bobbak Safaipour
(74) *Attorney, Agent, or Firm* — Fish & Richardson P.C.

(57) ABSTRACT

Enhanced eye-tracking techniques for augmented or virtual reality display systems. An example method includes obtaining an image of an eye of a user of a wearable system, the image depicting glints on the eye caused by respective light emitters, wherein the image is a low dynamic range (LDR) image; generating a high dynamic range (HDR) image via computation of a forward pass of a machine learning model using the image; determining location information associated with the glints as depicted in the HDR image, wherein the location information is usable to inform an eye pose of the eye.

20 Claims, 23 Drawing Sheets

(56) References Cited

U.S. PATENT DOCUMENTS

| | | | |
|---|---|---|---|
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0103306 A1 | 4/2015 | Kaji et al. | |
| 2015/0160726 A1* | 6/2015 | Sullivan | G06V 40/19 345/156 |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2017/0237974 A1* | 8/2017 | Samec | H04N 13/122 348/53 |
| 2019/0324276 A1 | 10/2019 | Edwin et al. | |
| 2019/0340435 A1* | 11/2019 | Rabinovich | G06V 10/82 |
| 2020/0372678 A1* | 11/2020 | Farmer | G06F 3/012 |
| 2021/0014477 A1 | 1/2021 | Jia et al. | |
| 2021/0049410 A1* | 2/2021 | Dierkes | G06F 3/0304 |
| 2021/0157401 A1* | 5/2021 | Abele | G02B 27/0172 |
| 2021/0382549 A1* | 12/2021 | Zheng | H04N 23/741 |
| 2021/0389593 A1* | 12/2021 | Miller | G06F 3/011 |
| 2022/0028175 A1* | 1/2022 | Samec | H04N 13/344 |
| 2022/0066553 A1* | 3/2022 | Kaehler | G06T 13/40 |
| 2022/0237823 A1* | 7/2022 | Farmer | G06F 3/012 |
| 2022/0301217 A1* | 9/2022 | Stuart | G06F 3/013 |

OTHER PUBLICATIONS

International Search Report and Written Opinion for PCT Application No. PCT/US2021/034975, dated Sep. 10, 2021.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking In Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Liang et al., "Method for reconstructing a high dynamic range image based on a single-shot filtered low dynamic range image," Vo. 28, No. 21 / Oct. 12, 2020 / Optics Express 31057.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wu, et al., "MagicEyes: A Large Scale Eye Gaze Estimation Dataset for Mixed Reality," arXiv:2003.08806c1 [cs.CV] Mar. 19, 2020.

* cited by examiner

ENHANCED EYE TRACKING TECHNIQUES BASED ON NEURAL NETWORK ANALYSIS OF IMAGES

INCORPORATION BY REFERENCE

This application is a non-provisional of and claims priority to U.S. Provisional Application No. 63/035,290, filed Jun. 5, 2020, entitled "ENHANCED EYE TRACKING TECHNIQUES BASED ON NEURAL NETWORK ANALYSIS OF IMAGE," which is hereby incorporated by reference in its entirety. This application also incorporates by reference the entireties of each of the following: U.S. Prov. Patent App. No. 62/873,641; U.S. Prov. Patent App. No. 62/940,785; U.S. Patent Publication No. 2019/0324276.

BACKGROUND

Field

The present disclosure relates to display systems and, more particularly, to augmented and virtual reality systems and devices.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

An example embodiment includes a method implemented by an augmented or virtual reality wearable system of one or more processors. The method comprises obtaining an image of an eye of a user of the wearable system, the image depicting glints on the eye caused by respective light emitters, wherein the image is a low dynamic range (LDR) image; generating a high dynamic range (HDR) image via computation of a forward pass of a machine learning model using the image; determining location information associated with the glints as depicted in the HDR image, wherein the location information is usable to inform an eye pose of the eye.

An example embodiment includes a method implemented by a system of one or more processors. The method comprises setting one or more parameters associated with an eyeball control rig, the eyeball control rig comprising a representation of an eyeball (or "eyeball replica"), a plurality of light emitters, and one or more imaging devices, and the one or more parameters indicating, at least, an orientation associated with the representation of the eyeball; obtaining a plurality of images of the representation of the eyeball, the images being low dynamic range (LDR) images obtained at different exposures; generating a high dynamic range (HDR) image based on the obtained images; and causing a machine learning model to be trained based on the obtained images and the HDR image, wherein the machine learning model is trained to generate an HDR image from an input LDR image.

DETAILED DESCRIPTION

This specification describes techniques for the enhancement of eye-tracking as used in augmented or virtual reality display systems. As will be described below, machine learning models may be used to increase an accuracy associated with eye-tracking. Example machine learning models may include neural networks, such as convolutional neural networks. These convolutional neural networks may be used to analyze input images, such as images of an eye of a user of an augmented or virtual reality display system. For example, a convolutional neural network may be used to generate a high-dynamic range (HDR) image from a low, or standard, dynamic range (LDR) image of the user's eye. In this example, the HDR image may reduce occurrence of over-exposed, or under-exposed, portions of the LDR image. These portions may correspond to reflections (e.g., glints) of light in the user's eye from LEDs fixed to the augmented or virtual reality display system (and/or other light sources). Based on locations of these glints and/or other image data, an orientation of the user's eye may be determined. Thus, reducing over-exposed portions of these glints may allow for an increased accuracy of determining locations of the glints and, thus, improved eye pose determinations.

Example Eye-Tracking Techniques

Figure 1:
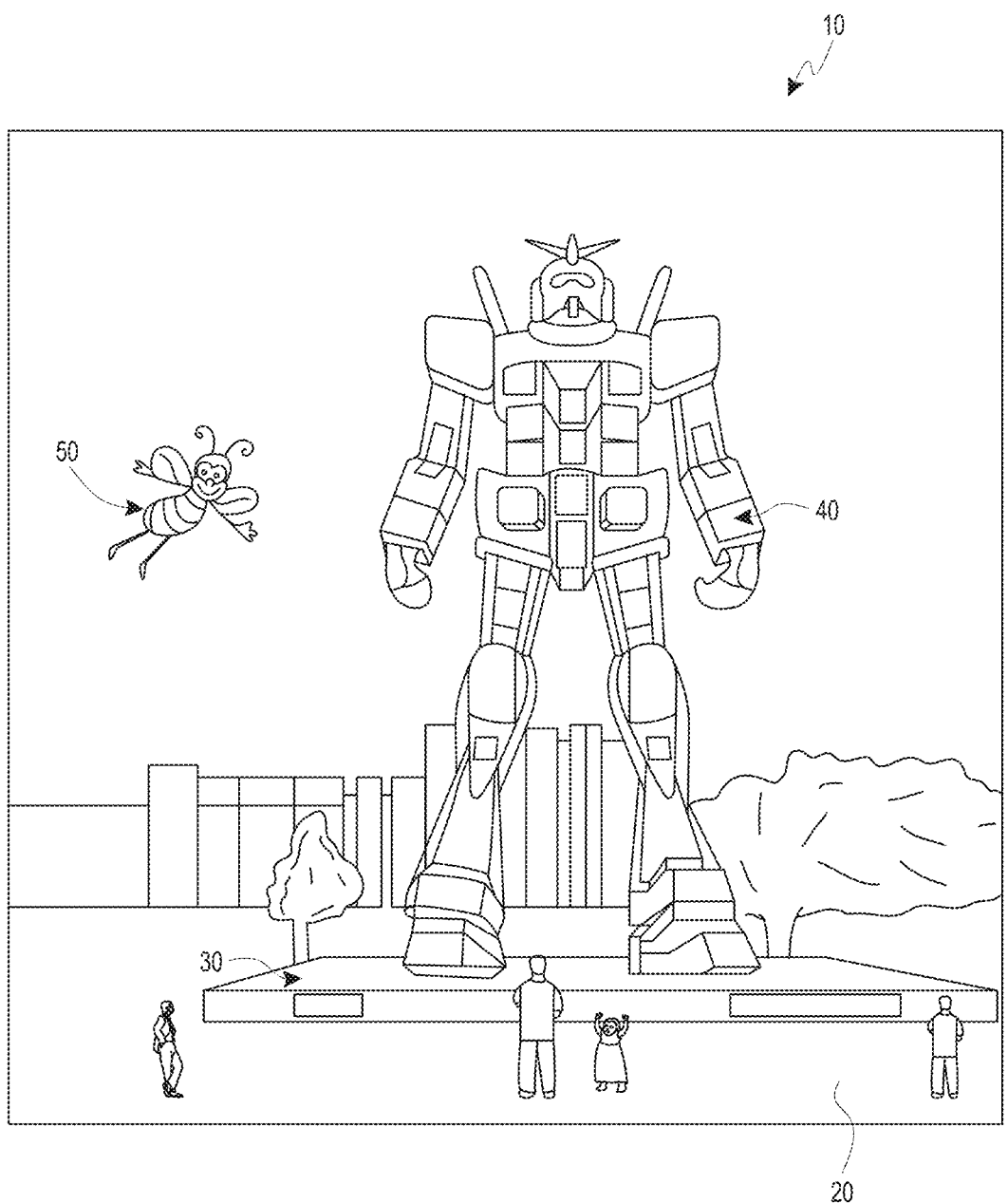
FIG. 1 illustrates a user's view of augmented reality (AR) through an AR device.

To provide for visually realistic virtual content, it is advantageous for an augmented or virtual reality display system or wearable system (hereinafter referred to as a 'display system') to accurately track (e.g., monitor) a user's eyes. For example, an accurate determination as to an orientation of each eye (referred to herein as an eye pose) may enhance realism of presented virtual content. Indeed, a virtual scene (e.g., the augmented reality scene 10 illustrated in FIG. 1) may be rendered by a display system based on a user's eyes being assigned as "render cameras" for the scene. For example, a center of the user's eyes may be assigned as render cameras. Thus, locations of virtual content within the virtual scene may be tied to the center of the user's eyes, along with the gaze direction and vergence of their eyes. As the user moves his/her eyes, for example to view virtual content or real world content, the display system may adjust virtual content accordingly. Thus, enhanced techniques for tracking the user's eyes may substantively enhance functionality of such display systems and provide a better viewing experience for the user.

Tracking a user's eyes may include determining vergence, gaze direction, respective centers of the user's eyeballs, and so on. At least some of these determinations may be effectuated based on an identification of respective eye poses for the user's eyes. For example, based on an eye's orientation, the display system may determine an axis (e.g., optical and/or visual axis) extending from the eye. This axis may represent a gaze direction of the user's eye. Using eye poses for both of the user's eyes, the display system may identify locations in three dimensional space at which the user's eyes are verging.

It will be appreciated that gaze direction tracking may be utilized to determine the virtual content to display to the user; for example, virtual content that is tied to the real world may be adjusted to provide the correct correspondence with the real world by tracking where the user is looking. In addition, in display systems that provide virtual content on different depth planes, the point at which the user's eyes are verging may be utilized to determine the appropriate depth plane on which to display the virtual content.

Some existing techniques for determining eye pose utilize one or more cameras positioned on a display system to obtain images of the user's eyes. Such camera-based systems may use a number of light emitting diodes (LEDs) to project light at a user's eyes. The LEDs may be positioned on the display system such that light from the LEDs is reflected from particular portions of the user's eyes (e.g., a pupil). A camera may be positioned on the display system to image the eye and determine the positions of the reflected light. As the user moves his/her eye (e.g., changes eye pose), the images and positions of reflected light may similarly change. Based analysis of the captured images of the eye, the display system may determine an eye pose.

To determine positions of the reflected light, the display system may determine a centroid of the light from each LED as reflected in the user's eye. For example, the display system may determine a centroid in an X and Y axis of an image obtained of the user's eye. In this way, the display system may determine a location associated with each LED. Based on a multitude of these locations for an image, the display system may determine an eye pose associated with the user's eye.

Further discussion related to eye-tracking is included in U.S. Prov. Patent App. No. 62/940,785 and U.S. Patent Publication No. 2019/0324276, which are hereby incorporated herein by reference in their entireties.

Example HDR Conversion

The above-described example techniques may allow for the accurate determination of a user's eye pose. However, they present certain technical challenges. For example, light from the LEDs may undergo different reflections in the user's eyes. This may introduce certain optical artifacts, such that the reflected light from an LED may be imaged as being an irregular shape. For example, the reflected light may not be substantially oval and may include a tail portion which extends from a circular or oval portion. An example of reflected light is included in FIG. 10B.

These optical artifacts may be caused, at least in part, by images of the user's eye being in low dynamic range (LDR). Therefore, portions of the images may result in loss of detail for highlights and shadows. As may be appreciated, the portions of an image which depict light from the LEDs may represent highlights of the image. For example, the luminosity of the light as reproduced in an image of the user's pupil may be greater than that of other portions of the image. Thus, the dynamic range available for the light may be limited such that there may be loss of detail in these highlights. This loss of detail may result in ill-defined, or irregularly shaped, light representing reflections of the LEDs in images of the user's eye. Determining positions of the reflected light may be therefore be negatively impacted.

High dynamic range (HDR) images allow for the reproduction of a greater dynamic range of luminosity as compared to LDR images. With respect to an HDR image of a user's eye, the reflected light from the LEDs may have greater detail as compared to an LDR image. Thus, it may be advantageous to use HDR images when performing eye-tracking techniques.

An example technique to generate an HDR image may include obtaining multiple LDR images of a substantially fixed scene. The LDR image may be obtained with different exposures, and then combined together. While this example technique is commonly used, in some embodiments it may be disadvantageous for augmented or virtual reality display systems. For accurate eye-tracking the display system may be required to determine eye pose at greater than a threshold frequency (e.g., 60 Hz, 120 Hz, 1000 Hz). To combine multiple LDR images, the cameras may be required to obtain multiple images at a substantially greater rate than the threshold frequency. As may be appreciated, the user's eye is unlikely to be able to remain substantially fixed for sufficient time to obtain the multiple images. The eyes are capable of rapid movements, such that obtaining multiple images of a substantially fixed eye may be impractical. Thus, an HDR image generated from multiple LDR images may reflect a smearing, or movement, of the reflected light from the LEDs as depicted in the LDR images.

As described herein, machine learning models may be leveraged to generate an HDR image from an LDR image. Example machine learning models may include neural networks, such as convolutional neural networks. An example convolutional neural network may include an autoencoder trained to encode an LDR image into a latent feature representation. The autoencoder may then decode the representation into an HDR image. Skip connections may optionally be utilized to provide domain transformation information from the encoder network to the decoder network. An example network is described in more detail below, with respect to FIG. 11.

Via machine learning models, the display system may, as an example, utilize a single LDR image while obtaining the benefits of an HDR image. In this way, the display system may more accurately determine positions of reflected light from the LEDs.

Example Wearable System

Figure 2:
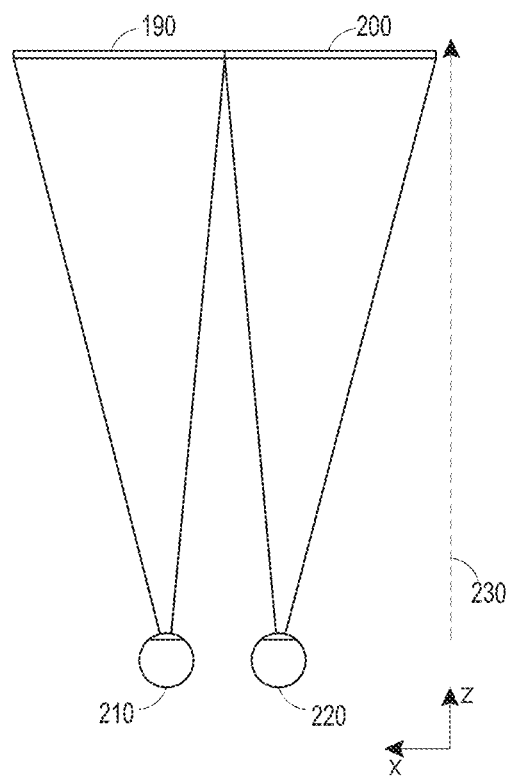
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
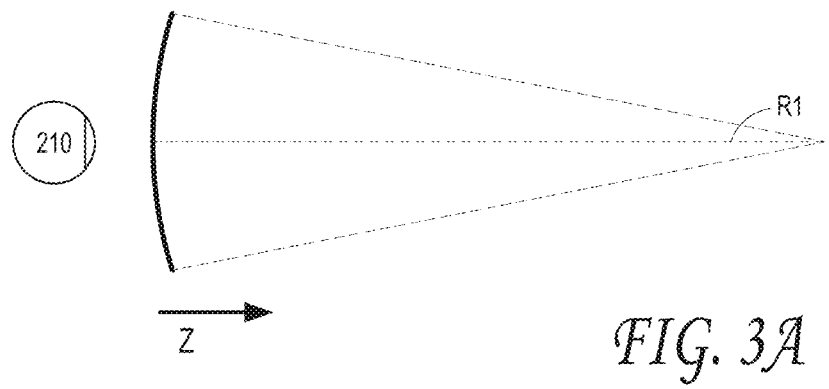
FIGS. 3A-3C illustrate relationships between radius of curvature and focal radius.
Figure 3B:
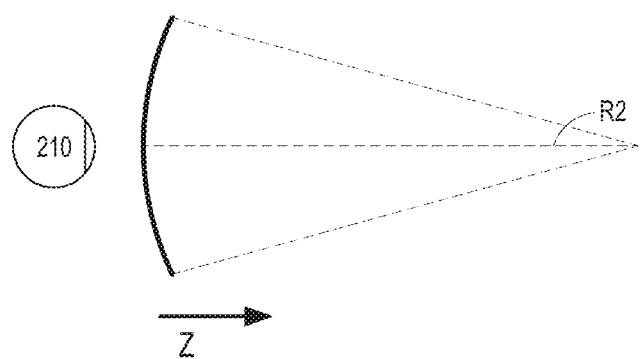
Figure 3C:
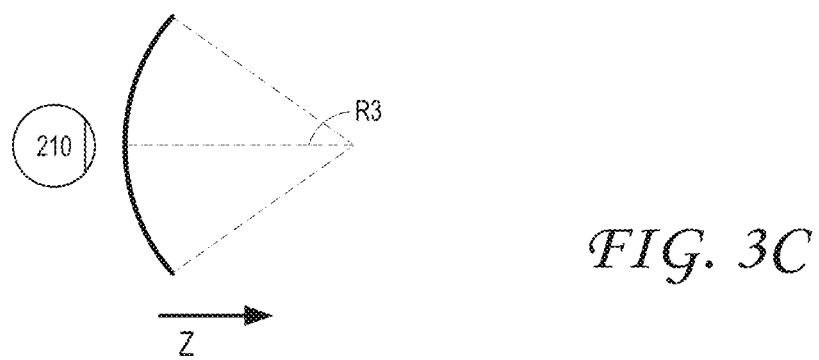

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
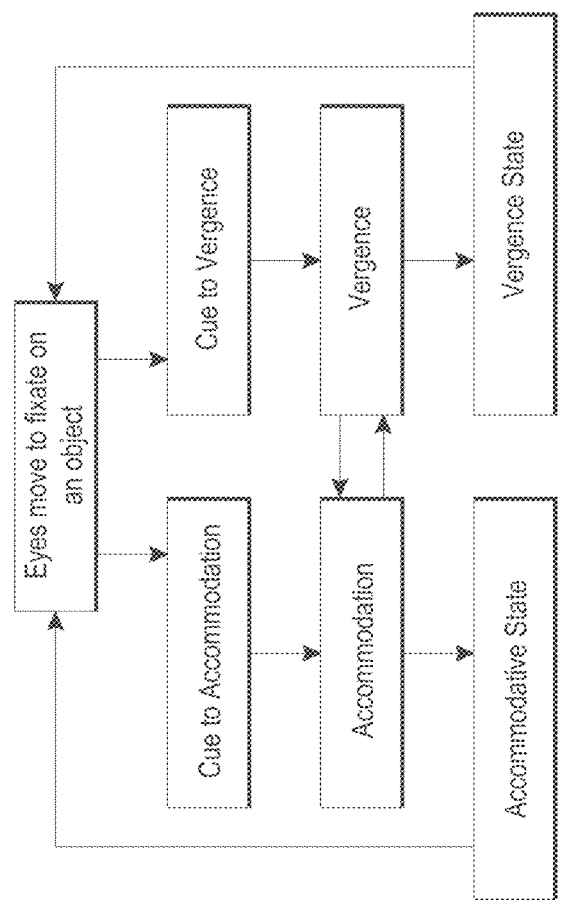
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
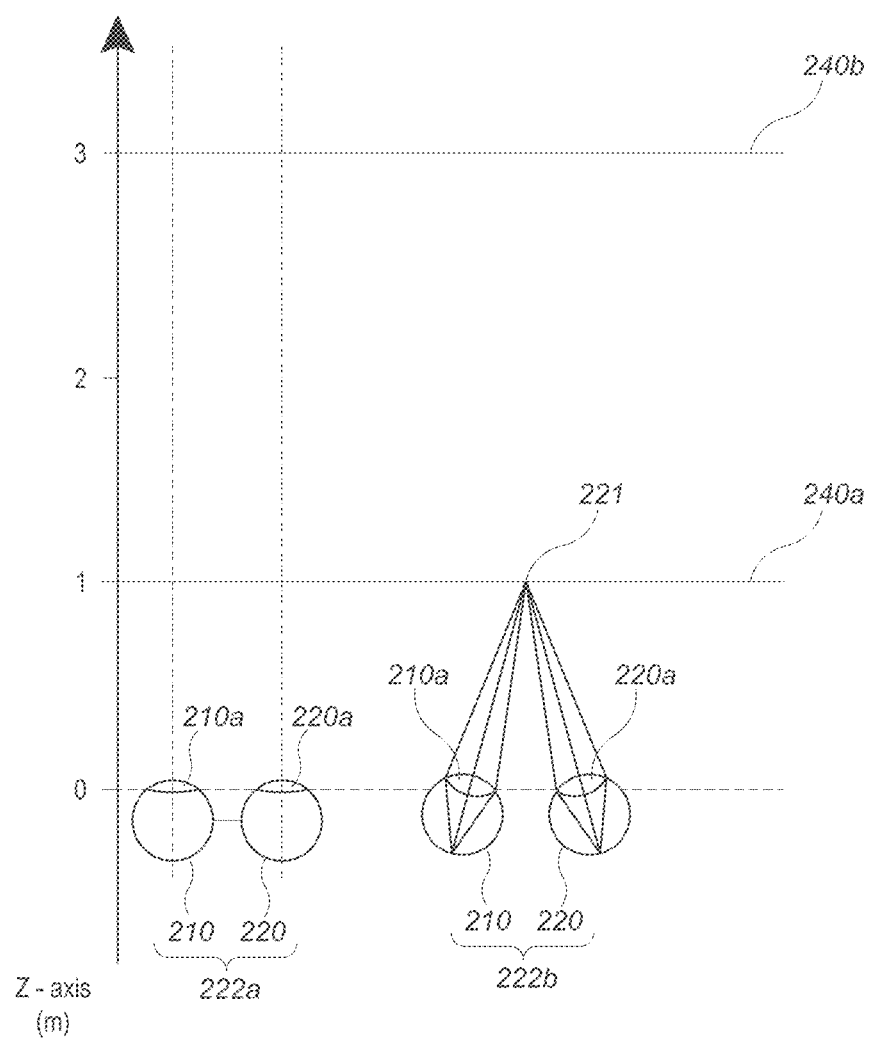
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
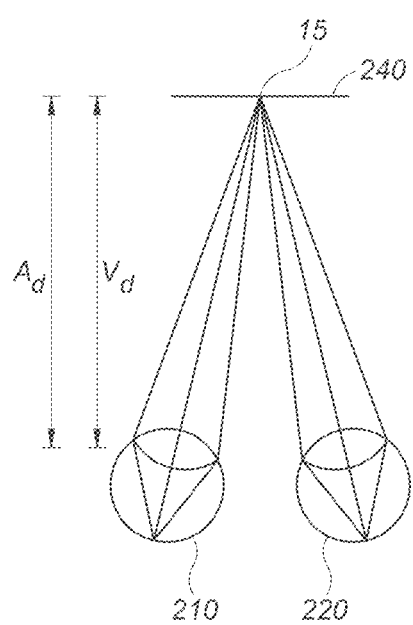
FIG. 4C illustrates an example of a representation of a top-down view of a user viewing content via a display system.
Figure 4D:
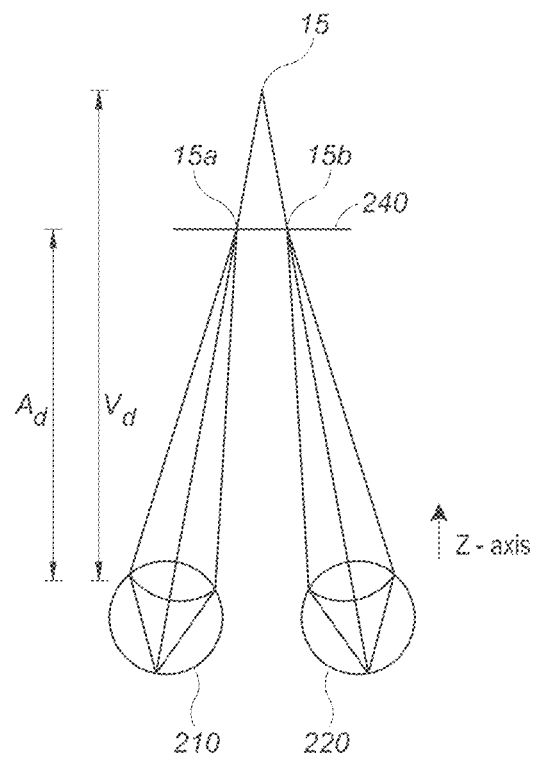
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the wearable system) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
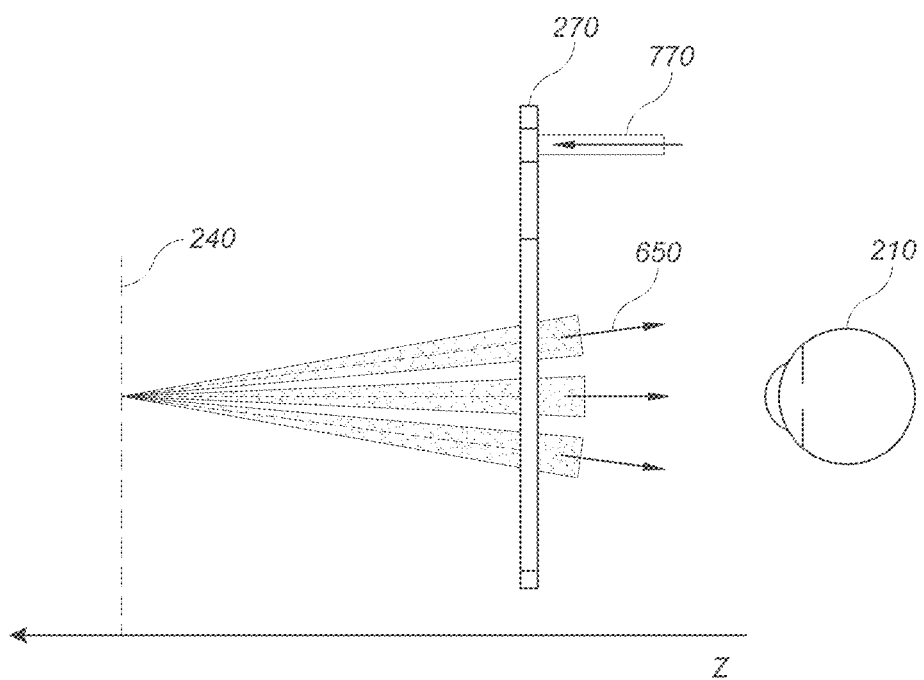
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
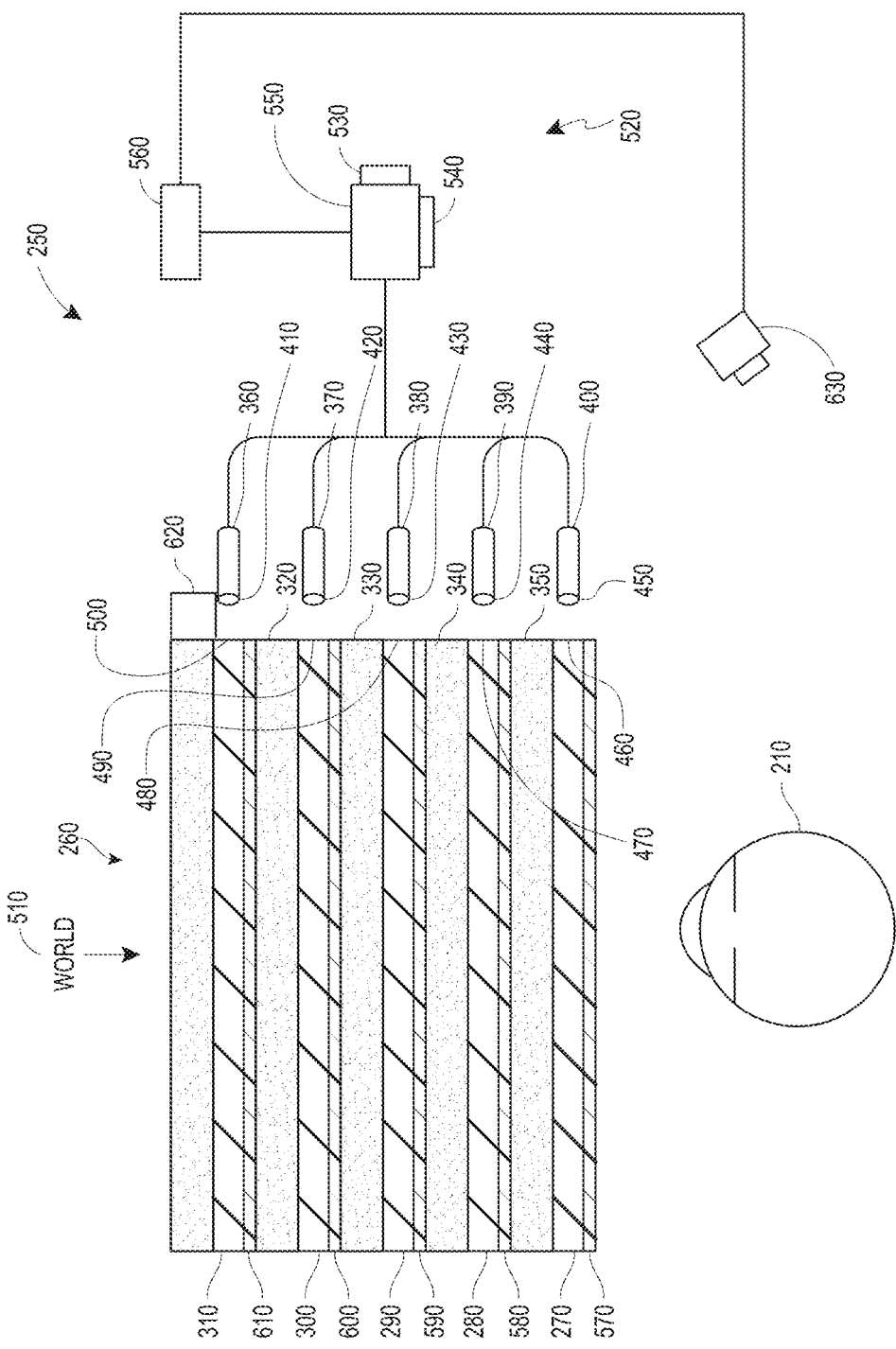
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9E) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame or support structure 80 (FIG. 9E) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
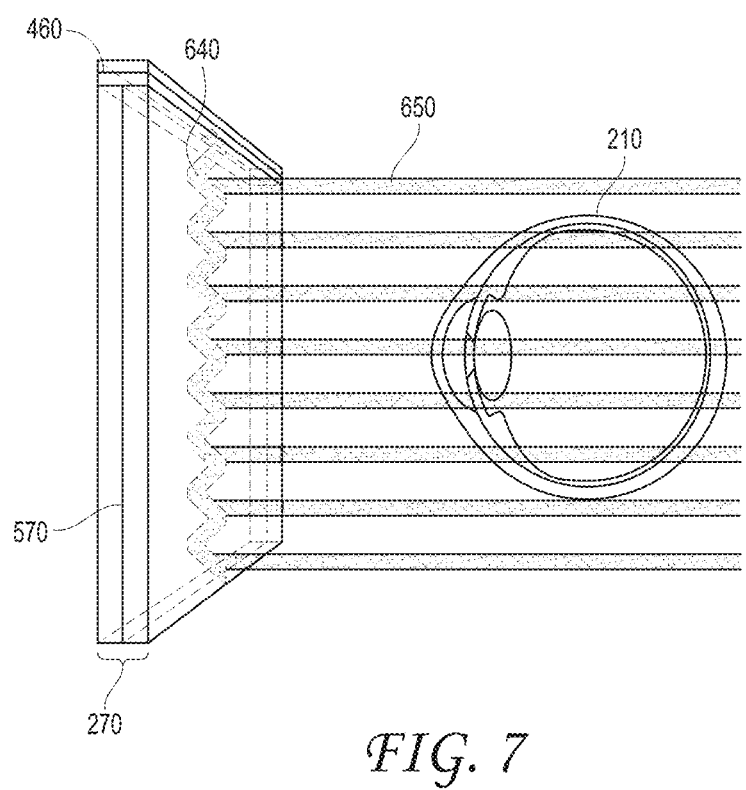
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
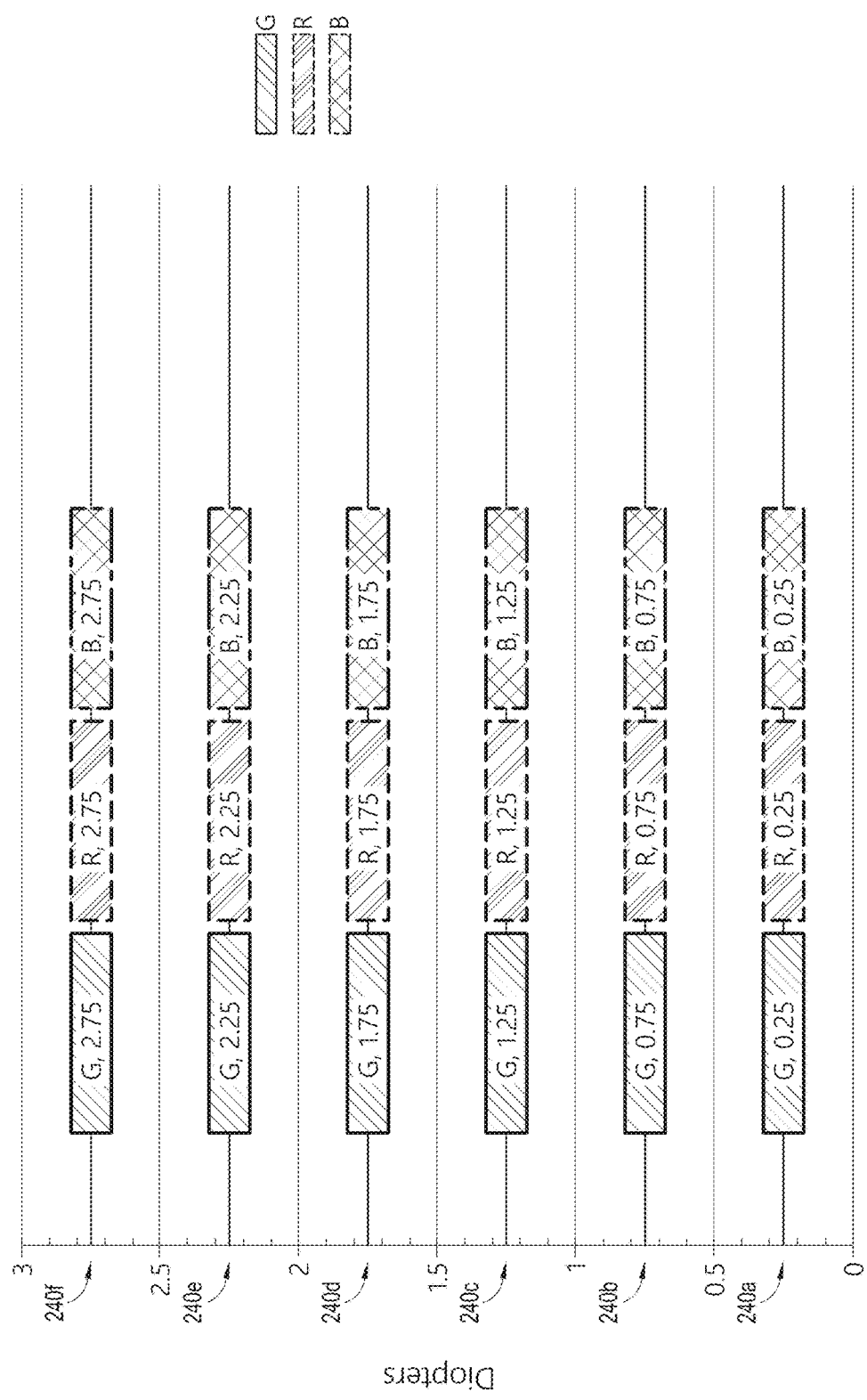
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
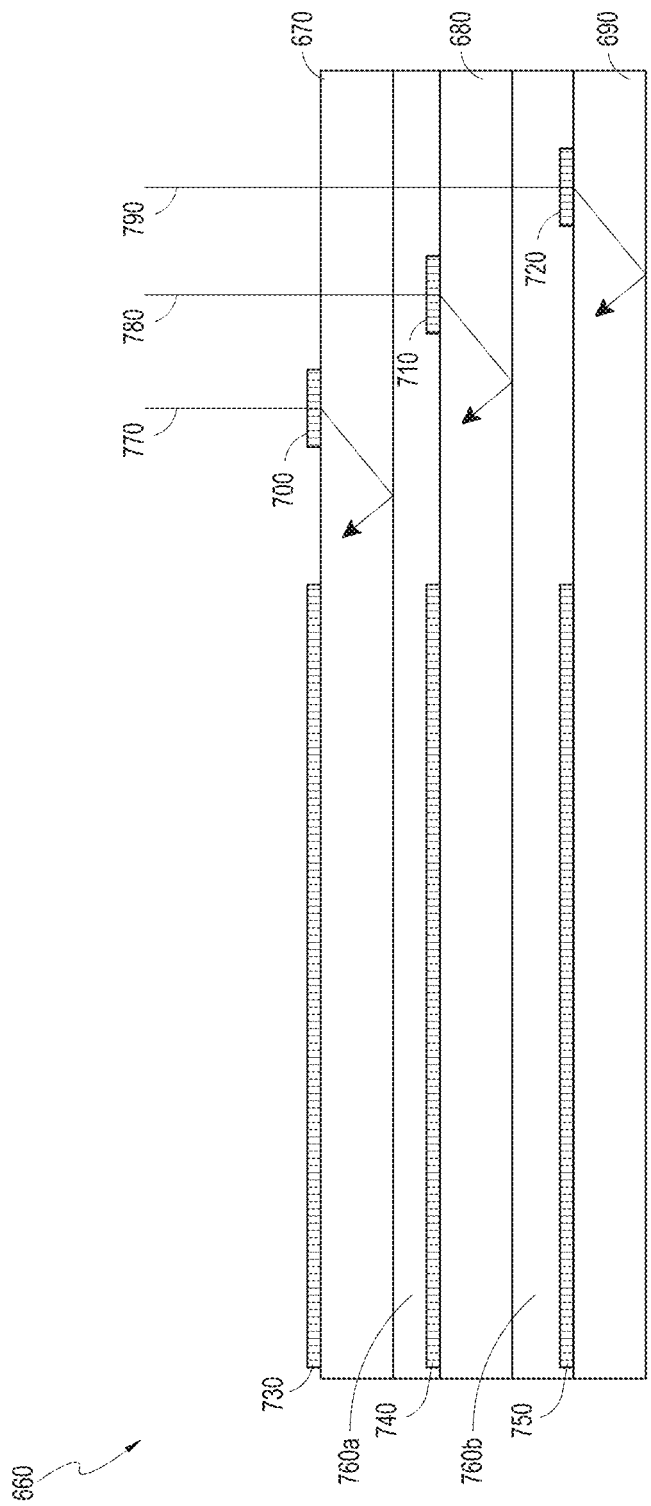
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
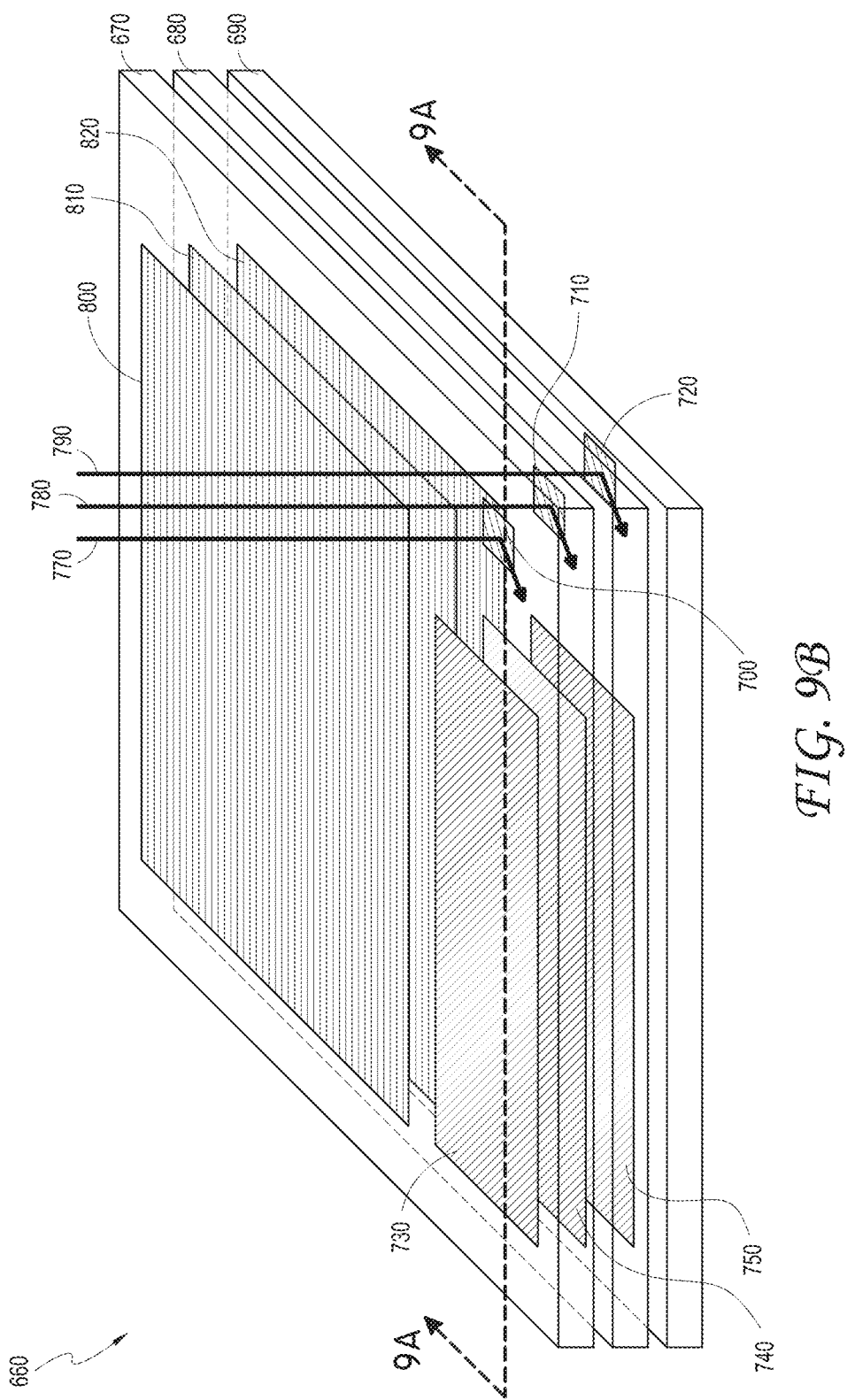
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
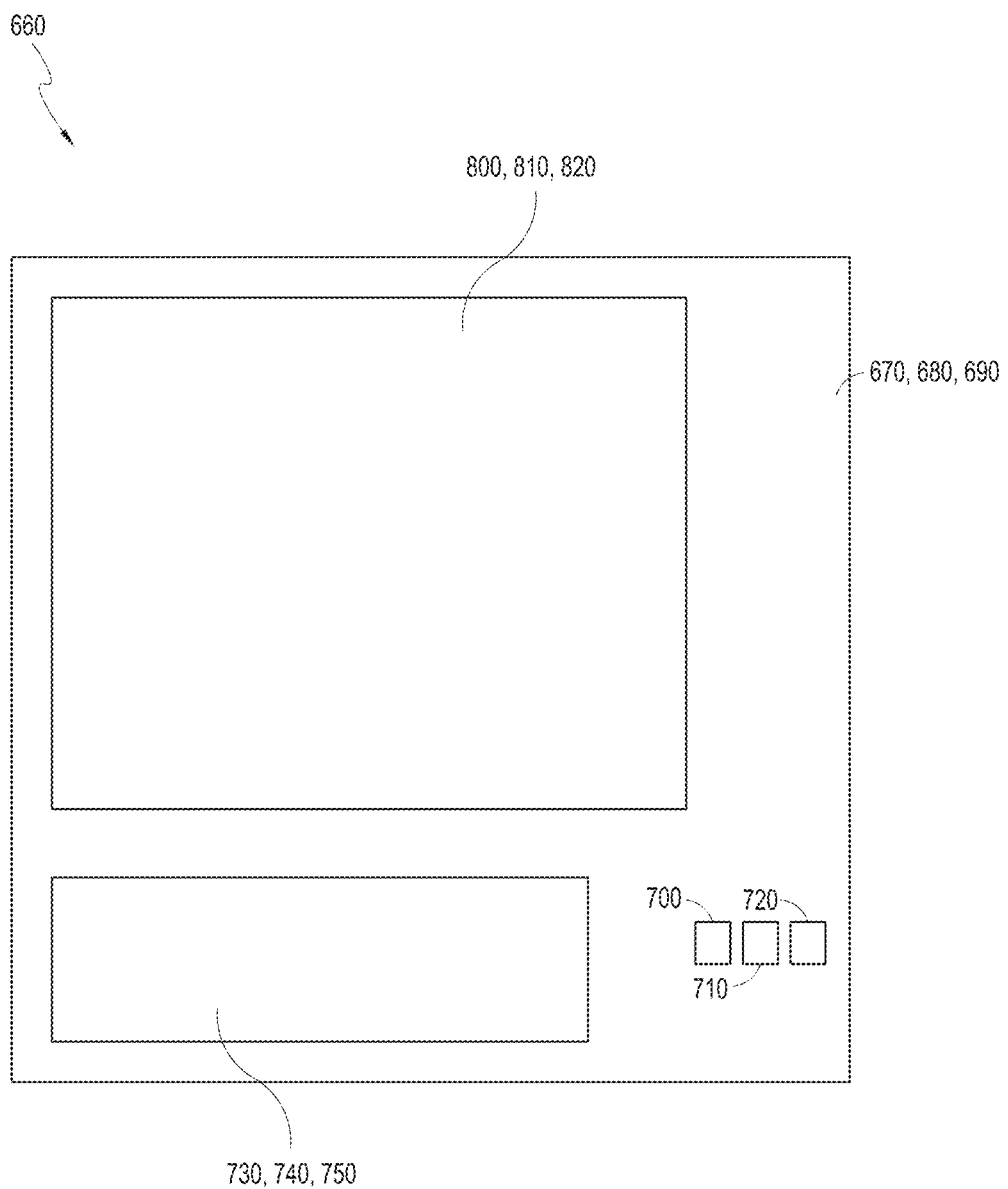
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some embodiments, laterally shifted areas have no overlap.

Figure 9D:
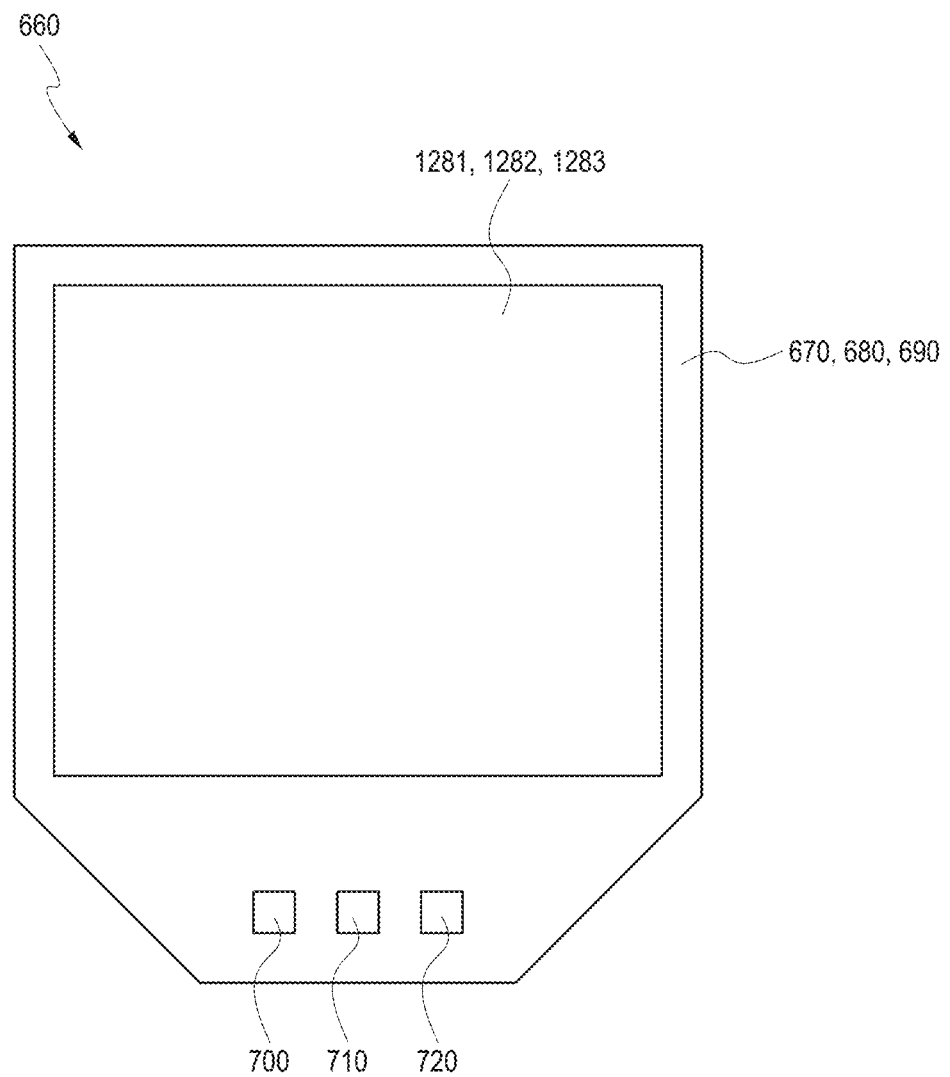
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some embodiments, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. application Ser. No. 16/221,359, filed on Dec. 14, 2018, the entire disclosure of which is incorporated by reference herein. The in-coupling optical elements 700, 710, 720 in-couple and direct light to the combined OPE/EPE's 1281, 1282, 1283, respectively. In some embodiments, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
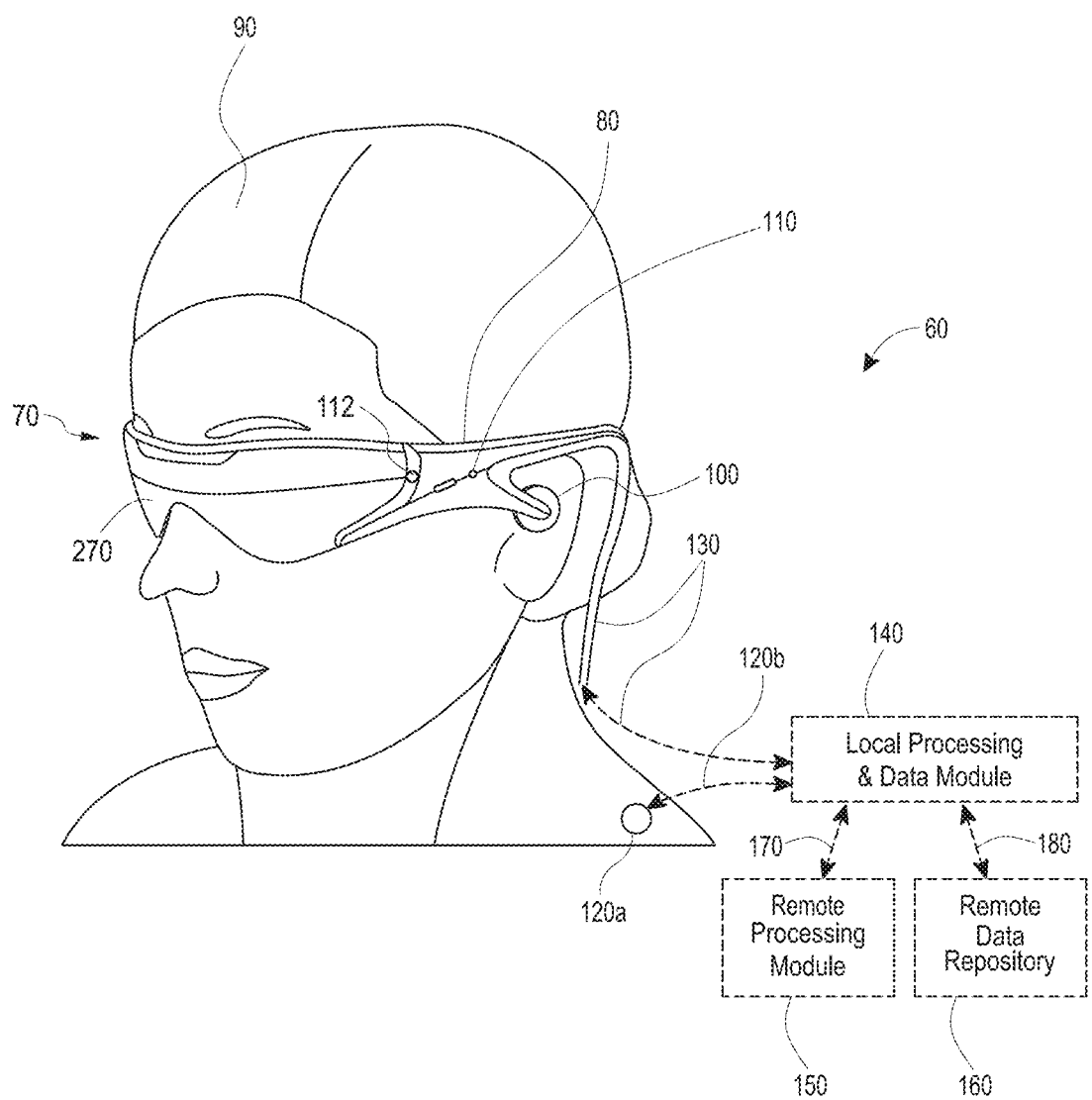
FIG. 9E illustrates an example of wearable display system.

FIG. 9E illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9E, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9E, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9E, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating virtual content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Enhanced Eye-Tracking Techniques

As described above, a display system (e.g., display system 60) may track a user's eyes to inform presentation of virtual content to the user. An example technique to track the user's eyes may include use of a multitude of light emitting diodes (LEDs). For example, LEDs may be positioned on the display system such that light from the LEDs is projected onto the eyes of the user. In some embodiments, the light may be projected onto the pupils of the user. One or more imaging devices (e.g., cameras) may be used to obtain images of the user's eyes. An image of an eye of the user will therefore include light reflected from at least some of the LEDs onto the eye. This reflected light may represent glints from the LEDs, and the glints may be reproduced in the image. Based on positions of the glints, an eye pose of the eye may be determined. For example, an orientation of the eye may be determined.

An imaging device used to take an image of the user's eye may have limited dynamic range. For example, the image may be a low dynamic range (LDR) image obtained using a particular exposure (e.g., particular exposure time, f-number, ISO value, and so on). Thus, certain portions of the LDR image may be under-exposes or over-exposed given the limited dynamic range. These portions may be assigned pixels values which are the same, or similar, and therefore have a loss of detail.

The above-described portions may commonly include the glints from the LEDs. For example, the glints may include reflections through disparate portions of the user's eye. In an LDR image, these reflections may not be assigned as a same, or similar, pixel value based on the limited dynamic range. Thus, an accurate determination as to a consistent identification of the glint, and not corresponding reflections thereof in the eye, may be difficult. In this way, the glints included in the LDR image may be inaccurately expanded in size or include irregular details (e.g., tails). An accuracy associated with determining positions of the glints may therefore be reduced. This reduced accuracy may translate into a loss of accuracy associated with determining eye-pose.

As will be described, the display system may utilize example machine learning techniques to generate high dynamic range (HDR) images from LDR images. These HDR images may allow for greater dynamic range with respect to, at least, the glints described above. Thus, the display system may more accurately determine positions of the glints. For example, a shape associated with the glint may be reproduced in the HDR image more accurately. As another example, certain irregular features (e.g., tails) may be reduced as compared to LDR images.

Advantageously, the display system may utilize certain machine learning models which are pre-trained to generate HDR images. For example, the display system may compute a forward pass of a convolutional neural network which has been previously trained using a wide variety of images. In this example, the convolutional neural network may allow for increased accuracy with respect to eye-tracking while allowing the network to be easily obtained (e.g., from a third party) and utilized in the display system.

In some embodiments, and as will be described, a system may train a machine learning model using images depicting glints. To train the machine learning model, the system may obtain LDR images and corresponding HDR images. The machine learning model may then be trained to reproduce an HDR image given an LDR image as an input. As an example, the machine learning model may represent the autoencoder illustrated in FIG. 11. Obtaining an LDR image and a corresponding HDR image may be impractical when imaging a user's eye. For example, to generate an HDR image the system may require multiple LDR images with different exposures. As described above, the user's eye may move too rapidly to obtain multiple LDR images in which the eye is substantially fixed.

Advantageously, the system may use an eyeball camera rig to obtain LDR images. The eyeball camera rig may include a representation of a human eye (e.g., a fake eyeball) along with LEDs and one or more imaging devices. The eyeball camera rig may be prepared to substantially mimic a user's eye in the display system described herein. The eyeball camera rig may be controlled to set parameters, such as orientation of the eye. In this way, the system may cause the representation of the human eye to be set into a particular orientation. The system may then obtain a multitude of LDR images at the particular orientation. These LDR images may then be combined into an HDR image.

In this way, the system may obtain training data usable to train a machine learning model. Since the training data is specific to augmented or virtual reality eye-tracking, the resulting accuracy of generating HDR images may be enhanced as compared to 'off the shelf' machine learning models. Further description of an eyeball camera rig is included in U.S. Prov. Patent App. No. 62/873,641, for example with respect to the system 100 described in U.S. Prov. Patent App. No. 62/873,641. U.S. Prov. Patent App. No. 62/873,641 is hereby incorporated by reference in its entirety.

Figure 10A:
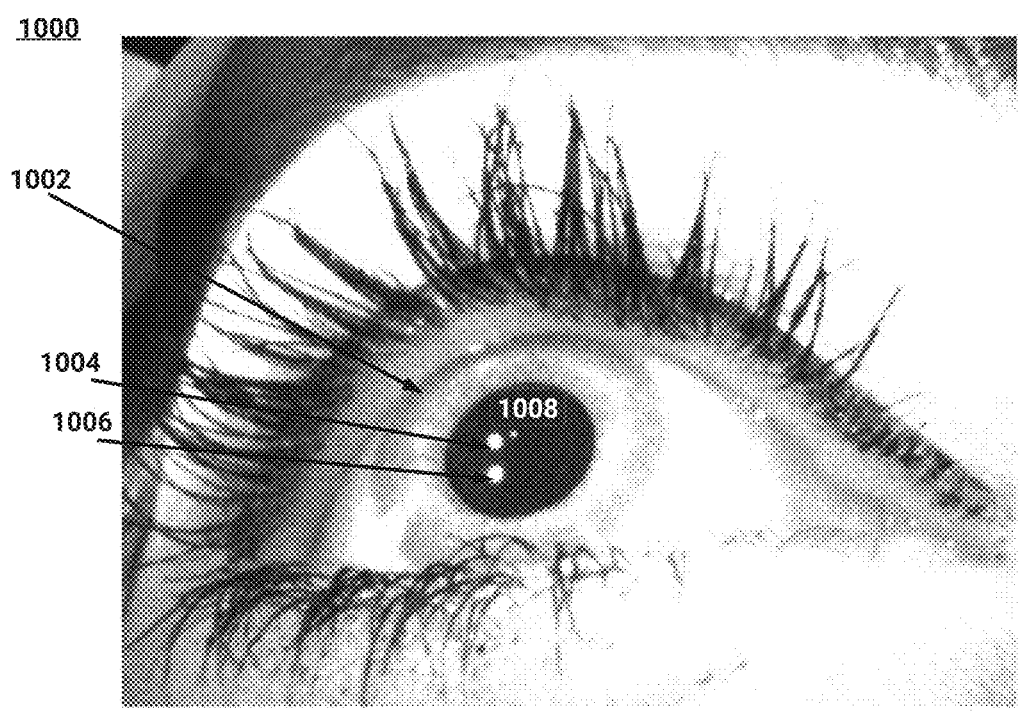
FIG. 10A illustrates an image of an eye obtained via an imaging device of a display system.

FIG. 10A represents an image 1000 of an eye 1002 obtained via an imaging device of a display system. The image 1000 of the eye 1002 depicts light reflected from light-emitting diodes (LEDs) of the display system. In some embodiments, the LEDs may output infrared light. As described herein, the light reflected from the LEDs may be referred to as glints (e.g., glints 1004-1006).

To determine a pose associated with the eye 1002, the display system may determine positions of the glints 1004-1006. In some embodiments, LEDs may provide light to a pupil 1008 of the eye 1002. Thus, the pupil 1008 may represent a contrasting background on which the glints 1004-1006 may be imaged.

The glints 1004-1006 may be over-exposed in the image 1000. For example, the image 1000 may be a low dynamic range (LDR) image of the eye 1002. In this example, images of the eye 1002 may be obtained at a particular exposure such that the dynamic range of the image 1000 may be limited. Since the pupil may, in some embodiments, be substantially darker than the glints 1004-1006, the glints may be assigned similar pixel values in the image 1000.

This similar assignment of pixel values may introduce inaccuracies in the resulting glints in the image 1000. For example, an LED's light may be reflected within the eye (e.g., different layers or portions of the eye). Due to the limited dynamic range, the image 1000 may depict the light, and various reflections thereof, with similar pixel values. For example, the light and the reflections may be depicted as highlights in the image 1000. In this way, the depiction of the LED's light may be expanded due to the reflections. Additionally, the reflections may result in irregular features being added to a glint depicted in the image 1000. For example, an LED's light may be depicted in image 1000 as a glint with a tail extending from an oval or circular portion of the glint.

Thus, respective shapes associated with the glints 1004-1006 may be incorrect due to, at least in part, the addition of these reflections. Given an LDR image, the display system may be unable to discriminate between an LED's light as reflected on a particular surface of the eye (e.g., a top surface layer) and the LED's light as reflected from other surfaces within the eye 1002. Therefore, the display system may be constrained in the accuracy associated with determining positions of the glints 1004-1006.

Figure 10B:
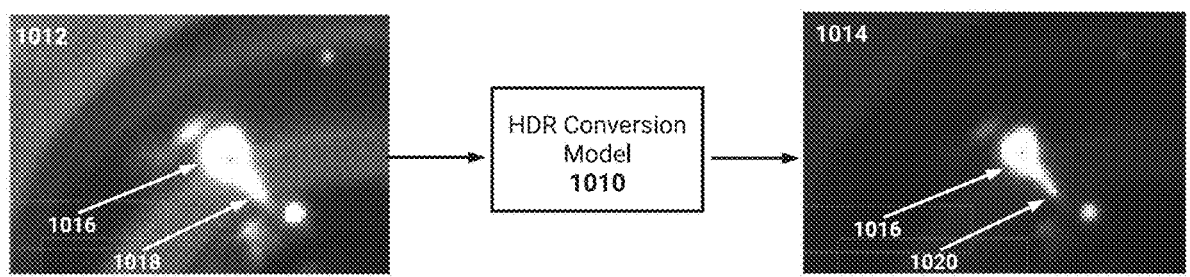
FIG. 10B illustrates a block diagram of a high dynamic range (HDR) conversion model usable to generate an HDR image from a low dynamic range (LDR) image.

FIG. 10B illustrates a block diagram of a high dynamic range (HDR) conversion model 1010 usable to generate an HDR image 1014 from a low dynamic range (LDR) image 1012. In some embodiments, the HDR conversion model 1010 may be the model illustrated in FIG. 11.

In the illustrated example, the LDR image 1012 includes a representation of a glint 1016 which has been overexposed. The glint 1016 is illustrated in the image 1012 with a tail 1018, which may be caused from reflections of an LED's light within a user's eye. A size of the tail may be irregular and may vary with orientation of the eye with respect to the LED.

The display system may generate the HDR image 1014 via the HDR conversion model 1010 to simulate an expansion of dynamic range. As illustrated, the glint 1016 has been reduced in size. For example, an upper oval or circular portion has been reduced in area. Additionally, the tail 1012 has been reduced in size as compared to the LDR image 1012.

As will be described in more detail below, with respect to FIG. 12, the HDR image 1014 may allow for a more accurate determination of eye pose. For example, a position of the glint 1016 may be more accurately determined in the HDR image 1014 as compared to the LDR image 1012.

Figure 11:
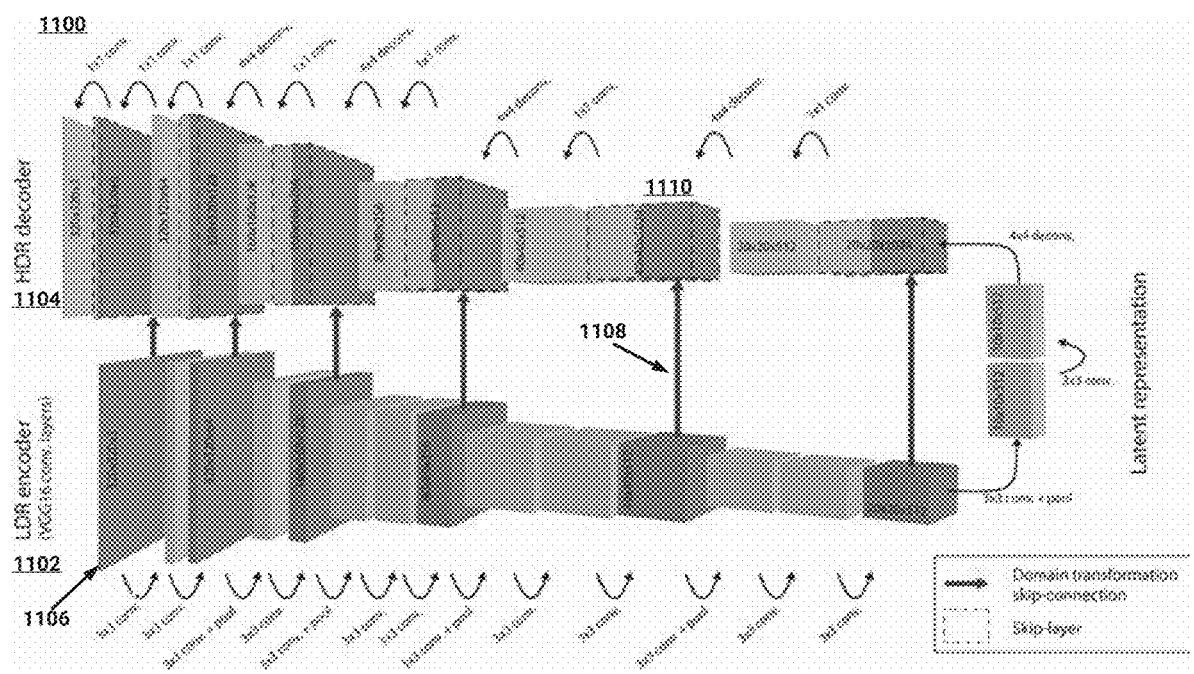
FIG. 11 illustrates an example machine learning model usable to generate an HDR image from an LDR image.

FIG. 11 illustrates an example machine learning model 1100 usable to generate an HDR image from an LDR image. The example model 1100 may represent an autoencoder, in which an encoder portion 1102 generates a latent feature representation of an in LDR image. A decoder portion 1104 may then generate an HDR image based on the latent feature representation.

The encoder portion 1102 includes a multitude of layers. Example layers include convolutional layers and pooling layers. In some embodiments, an input layer 1106 may receive an LDR image which is of a particular width and height (e.g., 320×320). The LDR image may additionally include color information, such that there are a threshold number of channels (e.g., 320×320×3). A system, such as the display system described herein, may then compute a forward pass to generate the latent feature representation.

While the input layer 1106 is illustrated as receiving an LDR image of a certain size (e.g., 320×320×3), in some embodiments the width and height may be different. As an example, the width and height may correspond to a width and height of an image obtained via an imaging device of the display system. In some embodiments, this width and height may be 400×400. This increased width and height may allow for greater model prediction accuracy by increasing the size of the latent space representation. Additionally, matching the input layer to a size of an image generated by the imaging device may result in accuracy increases. Optionally, in some embodiments the input LDR image may be monochrome. Thus, the input image may be 400×400×1. In some embodiments, a bit depth associated with values of the input images may be set. For example, 8 bits may be used as the bit depth.

In the example model 1100, skip connections are included (e.g., connection 1108). These skip connections may be used to provide information generated from the input LDR image to the decoder portion 1104. For example, the skip connections may include a domain transformation from LDR display values to logarithmic HDR. The fusion of the skip-connections may be initialized to perform an addition at skip-layers (e.g., layer 1110). For example, the skip-layer 1110 may concatenate information received from the 1108 with the layer of the decoder portion 1104 along the feature dimension.

The model 1100 illustrated in FIG. 11 is to be understood as an example. Thus, layers may be added, or removed, and fall within the scope of the disclosure herein. Additionally, filter sizes, activation functions, and so on, may be adjusted and fall within the scope of the disclosure herein.

Figure 12:
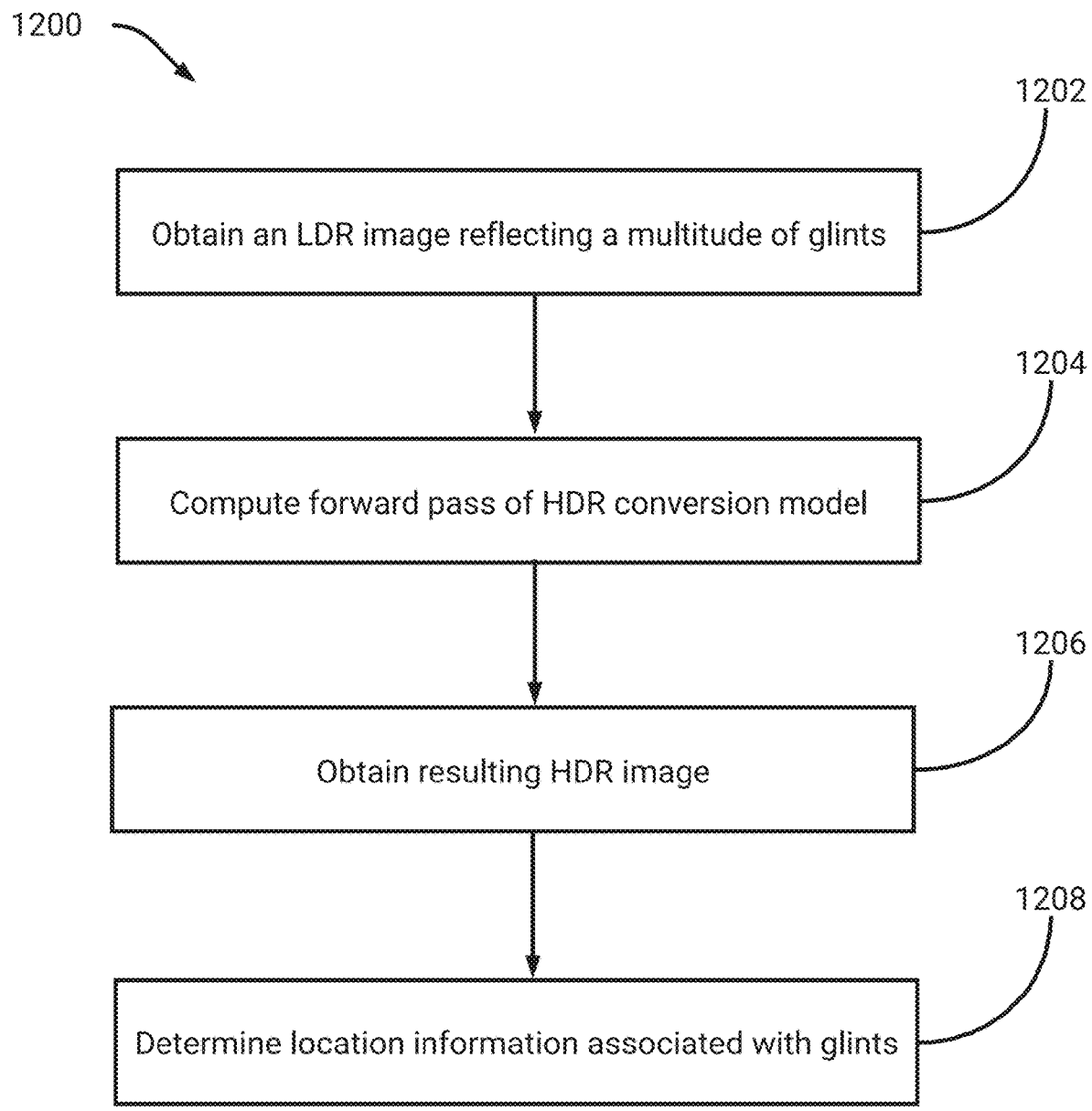
FIG. 12 is a flowchart of an example process for determining location information associated with glints represented in an LDR image.

FIG. 12 is a flowchart of an example process 1200 for determining location information associated with glints represented in an LDR image. For convenience, the process 1200 will be described as being performed by a display system of one or more processors (e.g., the display system 60). The process 1200 may also be performed during a calibration process and may be performed by a system of one or more processors. The system may control an eyeball camera rig as described in more detail below.

At block 1202, the display system obtains an LDR image. As described above, the display system may include an image capture assembly 630 to obtain images of the user's eyes. The image capture assembly 630 may include one or more image capture devices, such as a camera. Images from the camera may be an LDR image, such as a standard image with constrained dynamic range.

During operation of the display system, the display system may obtain the LDR image for use in eye-tracking. For example, LEDs may be positioned on the display system such that light from the LEDs is provided onto the user's eyes. The LDR image may therefore include glints representing the reflected light from the LEDs. An example image depicting glints is described above, with respect to FIG. 10A.

At block 1204, the display system computes a forward pass of an HDR conversion model. The display system may have the HDR conversion model stored (e.g., the model 1100), such that it can locally compute the forward pass. In some embodiments, the display system may provide the LDR image to an outside device or system (e.g., via a wired or wireless connection). The outside device or system may then compute the forward pass.

In some embodiments, the display system may use machine learning techniques, or other techniques, which do not require a forward pass through layers of a neural network. For example, techniques which rely upon application of tone maps may be employed.

At block 1206, the display system obtains the resulting HDR image. Based on the HDR conversion model, the display system may obtain the HDR image which has been adjusted to simulate an expanded dynamic range. In some embodiments, the display system may perform additional processing of the HDR image. For example, the image may be sharped (e.g., unmask sharpening may be applied). As another example, the display system may correct for certain types distortion. In this example, the display system may correct for distortion which is known to be associated with an imaging device of the display system (e.g., lens distortion). For example, barrel or pincushion distortion may be corrected. Optionally, the above-described additional processing may be performed on the LDR image.

At block 1208, the display system determines location information associated with the glints. In some embodiments, the display system can determine a region of interest associated with each glint in the HDR image. For example, the display system may determine a separation between the glints and the background eye. In this example, it may be appreciated that the eye may be substantially darker than the glints. The display system may then determine an average X value and an average Y value associated with a particular region of interest. The particular region of interest may represent a boundary of an associated glint. For example, the particular region of interest may be a bounding box or may be a polygon or curve which is indicative of a boundary of the associated glint.

For example, and with respect to the particular region of interest, the display system may add pixel values in the Y direction. In this example, the display system may determine a distribution (e.g., Gaussian distribution) based on these values. The display system may then select a highest pixel value based on the distribution, with the highest pixel value corresponding to a centroid in the Y direction. In this way, the display system may determine an X value and a Y value corresponding to a position of the glint.

In some embodiments, the display system may use machine learning techniques to assign a position to each glint represented in the HDR image. For example, a neural network may be trained based on images of glints and ground truth labels indicating positions of the glints. Additional description related to use of training machine learning models is included below.

FIG. 12 described use of a display system to generate an HDR image from an LDR image of a user's eyes. In some embodiments, the process 1200 may be performed as part of a calibration process. For example, positions of the LEDs, imaging devices, and so on, may be calibrated. This calibration process may be performed during an initial set up process by the user. The calibration process may further be performed by a system to inform settings to be used by display systems or positions of LEDs or imaging devices of the display systems. For example, the system may control an eyeball camera rig for calibration.

With respect to the example of an eyeball camera rig, an LDR image of the eyeball camera rig may be obtained. As will be described, the eyeball camera rig may include a representation of an eyeball which may be set by the system in a particular eye pose (e.g., orientation). The eyeball camera rig may further include LEDs and one or more imaging devices. Thus, the system may cause the eyeball camera rig to obtain an LDR image of the representation of the eye. The system may then generate an HDR image and determine positions of glints in the HDR image.

In some embodiments, the system may perform a calibration process based on the determined positions. For example, the system may determine to that certain LEDs need to be adjusted in position (e.g., for certain eye poses they may be outside of a pupil of the representation). As another example, the system may update a pulse width modulation associated with each LED. For example, the system may determine that a brightness of the LEDs is too great or too little. As another example, the system may determine exposure information for the imaging devices. For example, the system may determine that a shutter speed should be higher or that an ISO value should be adjusted.

The calibration process may allow for in-factory calibration. For example, it may enhance finding centroid of the glints described herein and thus enhance calibration accuracy. To avoid over-exposure or under-exposure, which are possible at the manufacturing line, the techniques described herein can help adjust the glint intensity to better range, hence better dot centroid finding, and more accurate calibration.

Techniques for Generating Training Data

To generate an HDR image, a pre-trained machine learning model may be used. For example, the display system may obtain pre-trained weights for a machine learning model. In this example, the weights may have been determined using training data comprising LDR and HDR images of varying subject matter. While this may provide enhanced accuracy with respect to determining positions of glints, in some embodiments training data specific to eye-tracking may be used.

Figure 14A:
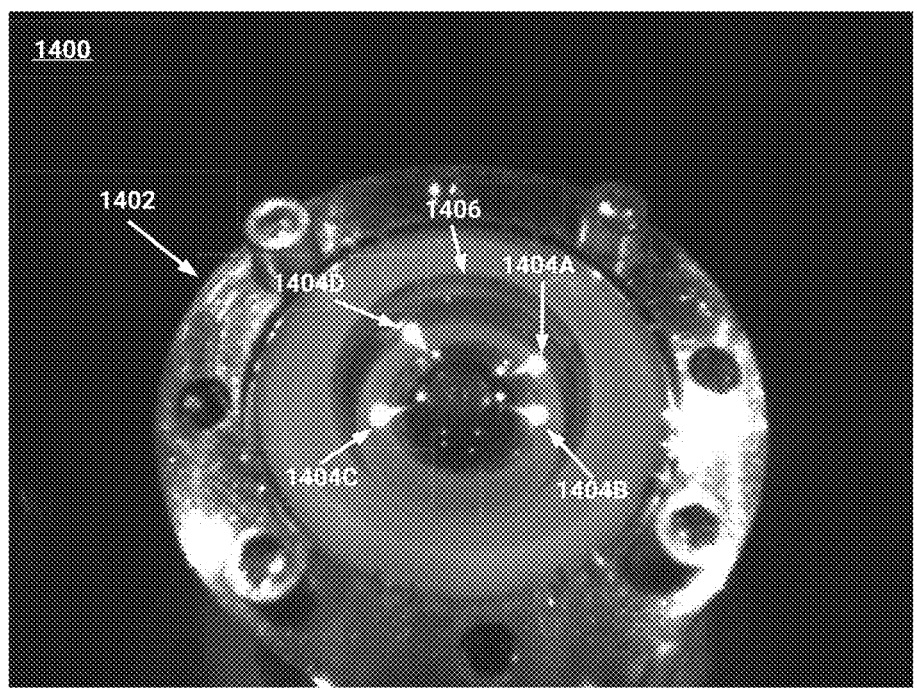
FIG. 14A illustrates an example of an LDR image of an eyeball camera rig according to the techniques described herein.
Figure 14B:
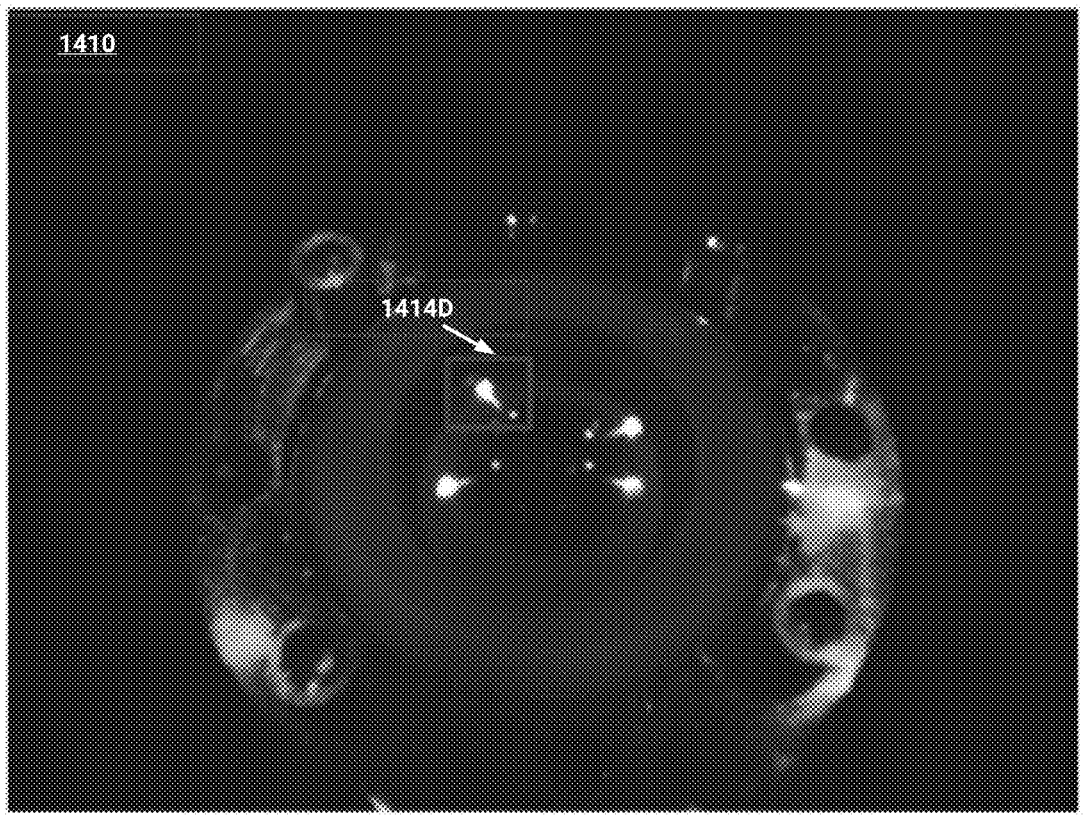
FIG. 14B illustrates an example of an HDR image of the eyeball camera rig according to the techniques described herein.

For example, and as will be described, LDR images and corresponding HDR images of glints may be obtained. In this example, an eyeball camera rig may be used. An example image obtained using an eyeball camera rig is illustrated in FIGS. 14A-14B. The eyeball camera rig may include a representation of an eye, and may be adjustable to specify an orientation (e.g., eye-pose) for the representation. In this example, a multitude of LDR images may be obtained from the eyeball camera rig at a particular orientation. A resulting HDR image may then be generated from these LDR images. The LDR images, and resulting HDR image, may then be used as training data.

In some embodiments, transfer learning techniques may be used to adjust pre-trained weights of the machine learning model. For example, a system may use backpropagation techniques to update values of the weights.

Optionally, the machine learning model may be initially trained using a multitude of training images obtained from a third party source. In this example, the training images may be identified as sharing certain similarities with the eye-tracking images described herein. As an example, they may be identified as depicting substantially dark backgrounds with highlights. In this example, a machine learning model may be used to identify these images via analyzing large publicly available data sets of images. Optionally, labels associated with the images may be used to inform selection of the initial training images.

The initial training images may then be used to train the machine learning model. Subsequently, the system may update the weights based on images obtained using the eyeball camera described above. In this way, and as an example, due to the variation in training images, the resulting model may provide a more robust network to generate HDR images.

Figure 13:
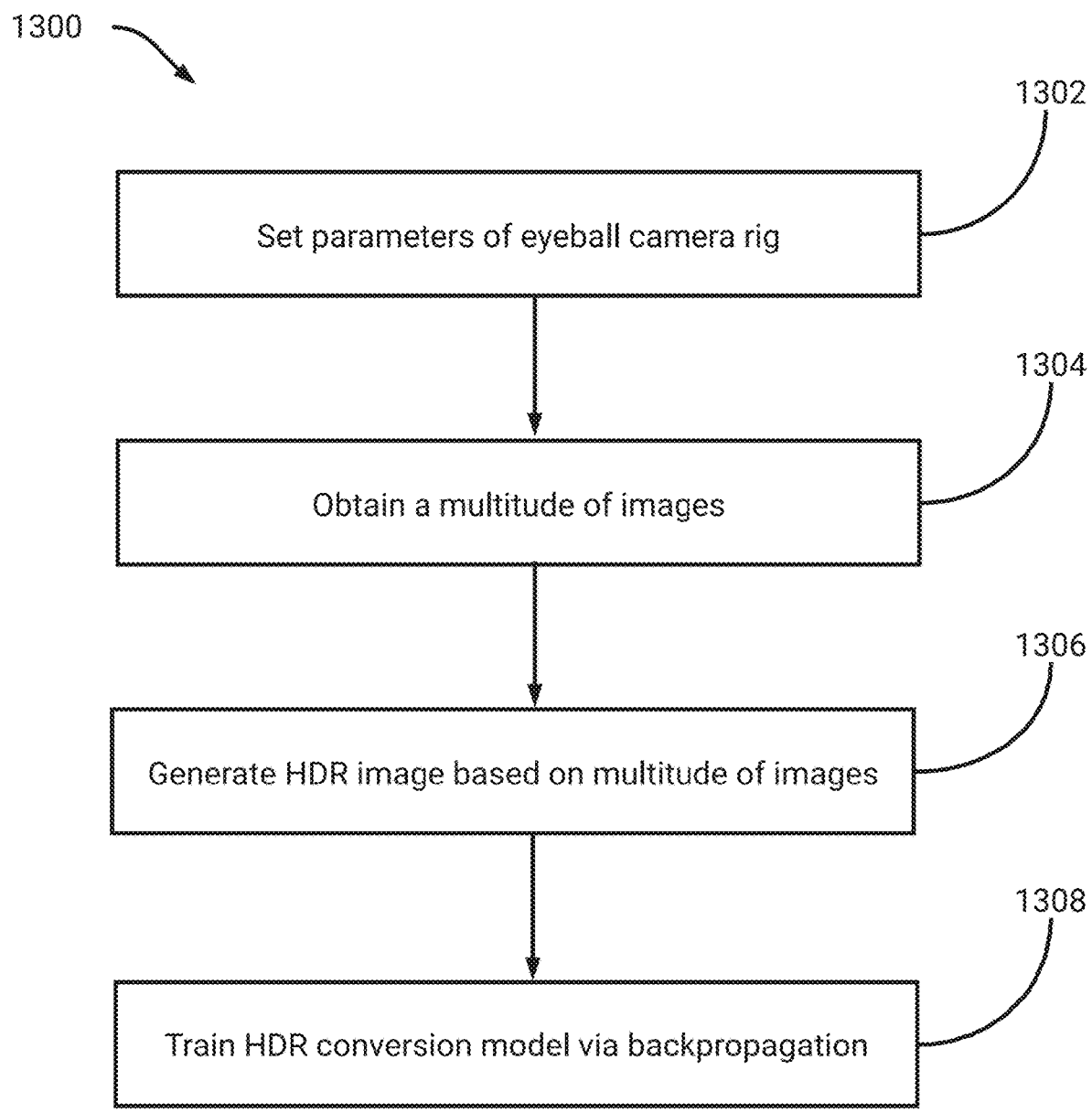
FIG. 13 is a flowchart of an example process for training an HDR conversion model.

FIG. 13 is a flowchart of an example process for training an HDR conversion model. For convenience, the process 1300 will be described as being performed by a system of one or more processors. In some embodiments, the system may generate weights associated with a machine learning model. The system may additionally enable access to the generated weights by one or more display systems.

At block 1302, the system sets parameters of an eyeball camera rig. As described above, the eyeball camera rig may represent a system usable to obtain images which mimic images of actual (e.g., human) eyes that may be obtained from display systems. For example, the eyeball camera rig may include a representation of an eyeball (also referred to as an "eyeball replica"), such as may be formed of one or more lenses and/or other optical components that closely resemble a human eyeball. As another example, the eyeball camera rig may include LEDs and one or more imaging devices. Additional description related to the eyeball camera rig is included in U.S. Prov. Patent App. No. 62/873,641, which is hereby incorporated by reference in its entirety.

The eyeball camera rig may be controlled by the system to specify an orientation (e.g., a "pose") of the eyeball replica. For example, the system can indicate that the eyeball replica is to translate and/or rotate around one or more axes. Additional parameters which may be controlled by the system include, pulse width modulation of each LED, exposure information of an imaging device (e.g., shutter speed; ISO value, such as gain; and f-number), background light (e.g., intensity of background lights outside of the eyeball camera rig, positions of the background lights, color or wavelength spectrum information of the background lights), and so on.

To create sufficient training data, the system may periodically adjust the parameters to obtain a wide breadth of training images. For example, the system may adjust the representation of the eye in discrete steps to obtain images with a multitude of orientations. For example, the pose of the eyeball replica may be adjusted every x seconds (e.g., 1, 2, 10, 30, 60 seconds or more) to a slightly different pose while images of the eyeball replica are obtained at the known eye pose. As another example, for each orientation the system may adjust an intensity of each LED. As another example, for reach orientation the display system may adjust exposure values. As another example, for each orientation the display system may adjust the background lights to simulate different real-world environments in which users may be located.

At block 1304, the system obtains a multitude of images for the parameters. At a particular orientation of the eyeball replica, the system may obtain a multitude of images (e.g., 2 images, 3 images, 5 images). As described above, the parameters may indicate different exposure values. Thus, the system may obtain a multitude of LDR images with different exposure values.

At block 1306, the system generates an HDR image. Using the multitude of LDR images for the particular orientation, the system may generate the HDR image. For example, the LDR images may be combined to increase a dynamic range capable of being represented.

At block 1308, the system trains the HDR conversion model. With respect to the autoencoder illustrated in FIG. 11, the system may train the model 1100 to reproduce the generated HDR image given the LDR images. Optionally, the system may train the model 1100 to reproduce the generated HDR image given only the LDR image which uses an exposure also used in a production environment. For example, the system may select the LDR image which corresponds to a same, or substantially similar, exposure used by an imaging device when imaging an end-user of a display system. As an example of training, backpropagation techniques may be used to update the weights of the model 1100. Additionally, distributions associated with latent feature variables (e.g., Gaussian distributions) may be updated.

FIG. 14A illustrates an example of an LDR image 1400 of an eyeball camera rig 1402, including the eyeball replica 1406, according to the techniques described herein. The LDR image 1400 may represent an image obtained by an imaging device of the eyeball camera rig 1402. For example, the system described in FIG. 13 may have set parameters to cause the eyeball camera rig 1402 to define a translation and/or rotation of eyeball replica 1406. The system may then trigger the imaging device to obtain the LDR image 1400.

The image 1400 includes a multitude of glints 1404A-1404D depicted on the eyeball replica 1406. As described in FIG. 13, the LDR image 1400 may be used as training information for an HDR conversion model. For example, the LDR image 1400 may be obtained at a particular exposure. The system may cause one or more other LDR images to be obtained at different exposures while the eyeball replica 1406 remains at the same pose.

In some embodiments, the LDR image 1400 may be processed prior to being used as training data. For example, the eyeball replica 1406 may be retained in the LDR image 1400 while other portions may be removed, such as through various digital image processing techniques.

FIG. 14B illustrates an example of an HDR image 1410 of the eyeball camera rig according to the techniques described herein. The HDR image 1410 may represent an HDR image generated by the system from a multitude of LDR images. The HDR image 1410 may also represent an HDR image generated by the system using the LDR image 1400 as an input to an HDR conversion model. As illustrated, glint 1404D in LDR image 1400 has been updated in the HDR image 1410. For example, corresponding glint 1414D has been adjusted such that a position of the glint 1414D may be more readily determined.

While the description of FIGS. 13-14B focused on generating training data to generate HDR images, in some embodiments the training data may reflect positions of glints. For example, in addition to generating LDR images, the system may label positions of the glints in the LDR images. In this example, the positions may be determined based on the parameters set by the system. For example, the system may set parameters indicating a particular translation and/or rotation of the eyeball replica. The system may also have access to known positions of the LEDs. Thus, the system may identify positions at which the LEDs should be visible in an image obtained by an imaging device. As an example, the system may translate the LEDs into an image space associated with the imaging device.

These positions may be used as ground truth labels by a machine learning model, such as the HDR conversion model. In this way, the model may be trained to label glints as corresponding to certain positions. Optionally, in some embodiments the machine learning model may be trained to label positions of glints without converting an LDR image to an HDR image. Techniques to label positions of glints without HDR images are described in more detail below, with respect to FIG. 15.

Figure 15:
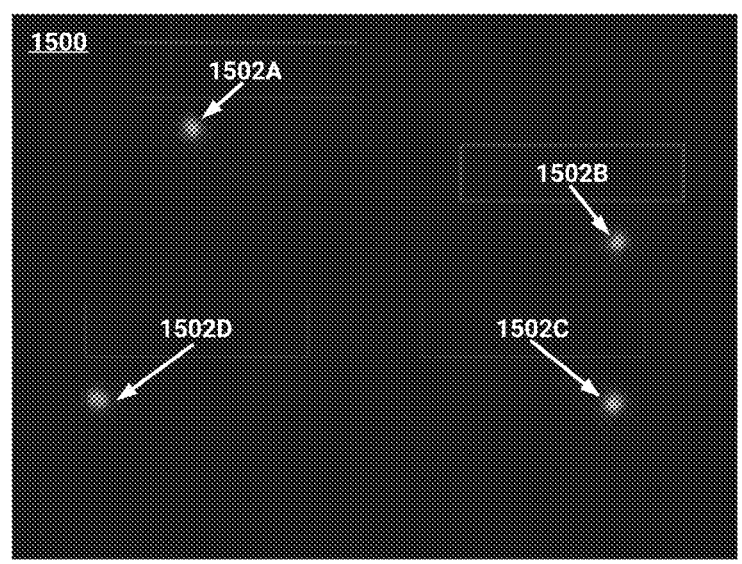
FIG. 15 is an example of an image of the eyeball camera rig based on tuning parameters of the eyeball camera rig.

FIG. 15 is an example of an image 1500 of an eyeball camera rig with imaging parameters set to obtain ground truth images for training the neural network. For example, the imaging parameters (e.g., camera exposure, gain, PWM, etc.) may be set to obtain images that are very dim, and that substantially exclude features other than the center of the glints. Optionally, such images may be used in the CNN training to develop a neural network that can more accurately convert LDR images to HDR images. The image 1500 may be used as part of an end-to-end training technique in which a neural network is trained to generate HDR images from input LDR images and assign positions to glints in the input images.

In some embodiments, a machine learning model may be trained to label positions of glints based on an input image depicting the glints. In these embodiments, the eyeball camera rig may be utilized to set an orientation of an eyeball of the eyeball camera rig. For example, rotation and/or translation about one or more axes may be set.

Once an orientation is set, the system described above may adjust parameters until the glints in an obtained image are sufficiently dim. To cause the glints to be dim, the system may reduce a pulse width modulation of the LEDs and/or may adjust an exposure of the imaging device. For example, image 1500 depicts glints 1502A-1502D which are sufficiently dim to eliminate overexposure of the glints. Additionally, and as illustrated, the glints 1502A-1502D do not include the irregular portions included in FIG. 10B (e.g., the tail portions).

The system may therefore determine a centroid of each glint in the X and Y dimensions. For example, the system may determine a Gaussian distribution along each dimension and identify a location in the image 1500 with a highest value. This may allow for the system to determine a location of each glint with sub-pixel accuracy.

Subsequently, the system may increase the pulse width modulation or exposure to cause the glints to get brighter. The system may obtain one or more images depicting the glints becoming more akin to the glint 1016 illustrated in FIG. 10B. Since having dim glints may be impractical during production use of a display system by a user, the system may raise the brightness of the glints until it is similar to that of glint 1016.

A machine learning model, such as a convolutional or fully-connected neural network, may then be trained to assign the determined glint locations to each of the images. Thus, the machine learning model may associate the glints 1502A-1502D with respective determined locations. Additionally, the machine learning model may also associate brightened glints in subsequent images with the respective determined locations. Since these brightened glints may have irregular portions, such as tails, the machine learning model may learn to determine correct locations irrespective of the irregular portions.

The resulting machine learning model may then be provided to a display system for implementation.

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A method implemented by an augmented or virtual reality wearable system of one or more processors, the method comprising: obtaining an image of an eye of a user of the wearable system, the image depicting glints on the eye caused by respective light emitters, wherein the image is a low dynamic range (LDR) image; generating a high dynamic range (HDR) image via computation of a forward pass of a machine learning model using the image; and determining location information associated with the glints as depicted in the HDR image, wherein the location information is usable to inform an eye pose of the eye.

Example Two: The method of example one, wherein the image is obtained with a particular exposure associated with an imaging device of the wearable system.

Example Three: The method of example one, wherein the light emitters are light-emitting diodes.

Example Four: The method of example one, wherein the light emitters are infrared light-emitting diodes.

Example Five: The method of example one, wherein the machine learning model is a convolutional neural network.

Example Six: The method of example one, wherein the machine learning model is an autoencoder with a plurality of convolutional layers, the autoencoder including an encoder portion which generates a latent feature representation associated with the image and a decoder portion which generates the HDR image based on the latent feature representation.

Example Seven: The method of example six, wherein one or more skip connections connect the encoder portion and the decoder portion, the skip connections providing domain transfer information from the encoder portion to the decoder portion.

Example Eight: The method of example seven wherein the domain transfer information comprises logarithmic HDR values generated from LDR display values of the image.

Example Nine: The method of example one, wherein the glints are depicted on a pupil of the eye.

Example Ten: The method of example one, wherein the glints depicted in the image are of a greater size than glints depicted in the HDR image.

Example Eleven: The method of example one, wherein each glint depicted in the image includes a larger irregular portion than a corresponding glint included in the HDR image.

Example Twelve: The method of example eleven, wherein the irregular portion is a tail extending from an oval or circular portion of the glint.

Example Thirteen: The method of example one, wherein the machine learning model was trained to generate an HDR image from a corresponding LDR image based on training data, the training data comprising a multitude of LDR image and HDR image pairs, wherein the LDR image and HDR image pairs are generated using an eyeball camera rig.

Example Fourteen: The method of example thirteen, wherein the eyeball camera rig comprises a representation of an eyeball, a plurality of light emitters, and one or more imaging devices.

Example Fifteen: The method of example fourteen, wherein the eyeball camera rig is controllable by a system of one or more processors, the system specifying parameters to control the eyeball camera rig, wherein the parameters comprise one or more of an orientation of the eyeball replica, pulse width modulation of the light emitters, or exposure information for the imaging devices.

Example Sixteen: The method of example fourteen, wherein the training data comprises a plurality of first LDR images and a first HDR image, wherein the first LDR images were obtained of the eyeball camera rig with the eyeball replica in a particular orientation, and wherein the first LDR images were obtained with different exposures.

Example Seventeen: The method of example sixteen, wherein the first HDR image was generated via combining the first LDR images, and wherein the machine learning model was trained to generate the first HDR image from each of the first LDR images.

Example Eighteen: The method of example one, wherein determining a location of a glint comprises: identifying a region of interest associated with the glint, the region of interest representing a boundary of the glint as depicted in the HDR image; determining respective distributions along two axes of the HDR image, the distributions being determined based on pixel values included in the region of interest; and assigning a location based on the determined distributions.

Example Nineteen: The method of example eighteen, wherein the assigned location corresponds to the highest values of the distributions along the two axes.

Example Twenty: The method of example eighteen, wherein the distributions are Gaussian distributions.

Example Twenty-one: The method of example one, wherein the eye pose is usable for eye-tracking of the eye.

Example Twenty-two: The method of example one, wherein an eye pose is determined for each of two eyes of the user.

Example Twenty-three: A display system of one or more processors, the display system comprising: a plurality of light emitters, the light emitters being positioned to provide light onto an eye of a user of the display system; an imaging device configured to obtain one or more images of the eye; and one or more processors and non-transitory computer storage media storing instructions that when executed by the one or more processors, cause the one or more processors to perform the method of examples one through twenty-two.

Example Twenty-four: A method implemented by a system of one or more processors, the method comprising: setting one or more parameters associated with an eyeball control rig, the eyeball control rig comprising a representation of an eyeball, a plurality of light emitters, and one or more imaging devices, and the one or more parameters indicating, at least, an orientation associated with the eyeball replica; obtaining a plurality of images of the eyeball replica, the images being low dynamic range (LDR) images obtained at different exposures; generating a high dynamic range (HDR) image based on the obtained images; and causing a machine learning model to be trained based on at least one of the obtained images and the HDR image, wherein the machine learning model is trained to generate an HDR image from an input LDR image.

Example Twenty-five: The method of example twenty-four, wherein the parameters further comprise pulse width modulation of the light emitters or exposure information for the imaging devices.

Example Twenty-six: The method of example twenty-four, wherein the HDR image was generated via combining the obtained images.

Example Twenty-seven: The method of example twenty-four, wherein the machine learning model is an autoencoder with a plurality of convolutional layers, the autoencoder including an encoder portion which generates a latent feature representation associated with the image and a decoder portion which generates an HDR image based on the latent feature representation.

Example Twenty-eight: The method of example twenty-seven, wherein one or more skip connections connect the encoder portion and the decoder portion, the skip connections providing domain transfer information from the encoder portion to the decoder portion.

Example Twenty-nine: The method of example twenty-eight, wherein the domain transfer information comprises logarithmic HDR values generated from LDR display values of an obtained image.

Example Thirty: The method of example twenty-four, wherein the light emitters are depicted as glints in each of the obtained images, the glints being at different positions on the eyeball replica.

Example Thirty-one: The method of example thirty, wherein the different positions of the glints are determined based on location information of the light emitters and the orientation of the eyeball replica, and wherein the machine learning model is trained to label the glints with the different positions.

Example Thirty-two: The method of example twenty-four, wherein the system is configured to adjust the orientation of the eyeball replica.

Example Thirty-three: The method of example twenty-four, wherein causing a machine learning model to be trained based on at least one of the obtained images and the HDR image comprises: selecting a particular image of the obtained images with exposure associated with an imaging device of an augmented or virtual reality display system; and causing the machine learning model to be trained based on the selected particular image and the HDR image.

Example Thirty-four: A system comprising one or more processors and non-transitory computer storage media storing instructions that when executed by the one or more processors, cause the processors to perform the method of examples twenty-four through thirty-three.

Other Embodiments

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

In addition, it will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims.

Accordingly, the claims are not intended to be limited to the embodiments shown herein, but are to be accorded the widest scope consistent with this disclosure, the principles and the novel features disclosed herein.

What is claimed is:

1. A method implemented by an augmented or virtual reality wearable system of one or more processors, the method comprising:
   obtaining an image of an eye of a user of the wearable system, the image depicting glints on the eye caused by respective light emitters, wherein the image is a low dynamic range (LDR) image;
   generating a high dynamic range (HDR) image via computation of a forward pass of a machine learning model using the image; and
   determining location information associated with the glints as depicted in the HDR image, wherein the location information is usable to inform an eye pose of the eye.

2. The method of claim 1, wherein the image is obtained with a particular exposure associated with an imaging device of the wearable system.

3. The method of claim 1, wherein the light emitters are light-emitting diodes.

4. The method of claim 1, wherein the light emitters are infrared light-emitting diodes.

5. The method of claim 1, wherein the machine learning model is a convolutional neural network.

6. The method of claim 1, wherein the machine learning model is an autoencoder with a plurality of convolutional layers, the autoencoder including an encoder portion which generates a latent feature representation associated with the image and a decoder portion which generates the HDR image based on the latent feature representation.

7. The method of claim 6, wherein one or more skip connections connect the encoder portion and the decoder portion, the skip connections providing domain transfer information from the encoder portion to the decoder portion.

8. The method of claim 7 wherein the domain transfer information comprises logarithmic HDR values generated from LDR display values of the image.

9. The method of claim 1, wherein the glints are depicted on a pupil of the eye.

10. The method of claim 1, wherein the glints depicted in the image are of a greater size than glints depicted in the HDR image.

11. The method of claim 1, wherein each glint depicted in the image includes a larger irregular portion than a corresponding glint included in the HDR image.

12. The method of claim 11, wherein the irregular portion is a tail extending from an oval or circular portion of the glint.

13. The method of claim 1, wherein the machine learning model was trained to generate an HDR image from a corresponding LDR image based on training data, the training data comprising a multitude of LDR image and HDR image pairs, wherein the LDR image and HDR image pairs are generated using an eyeball camera rig.

14. The method of claim 13, wherein the eyeball camera rig comprises a representation of an eyeball, a plurality of light emitters, and one or more imaging devices.

15. The method of claim 14, wherein the eyeball camera rig is controllable by a system of one or more processors, the system specifying parameters to control the eyeball camera rig, wherein the parameters comprise one or more of an orientation of the eyeball replica, pulse width modulation of the light emitters, or exposure information for the imaging devices.

16. The method of claim 14, wherein the training data comprises a plurality of first LDR images and a first HDR image, wherein the first LDR images were obtained of the eyeball camera rig with the eyeball replica in a particular orientation, and wherein the first LDR images were obtained with different exposures.

17. The method of claim 16, wherein the first HDR image was generated via combining the first LDR images, and wherein the machine learning model was trained to generate the first HDR image from each of the first LDR images.

18. The method of claim 1, wherein determining a location of a glint comprises:
   identifying a region of interest associated with the glint, the region of interest representing a boundary of the glint as depicted in the HDR image;
   determining respective distributions along two axes of the HDR image, the distributions being determined based on pixel values included in the region of interest;
   assigning a location based on the determined distributions.

19. A display system of one or more processors, the display system comprising:
   a plurality of light emitters, the light emitters being positioned to provide light onto an eye of a user of the display system;
   an imaging device configured to obtain one or more images of the eye; and
   one or more processors and non-transitory computer storage media storing instructions that when executed by the one or more processors, cause the one or more processors to perform operations comprising:
   obtaining an image of an eye of a user of the wearable system, the image depicting glints on the eye caused by respective light emitters, wherein the image is a low dynamic range (LDR) image;
   generating a high dynamic range (HDR) image via computation of a forward pass of a machine learning model using the image; and
   determining location information associated with the glints as depicted in the HDR image, wherein the location information is usable to inform an eye pose of the eye.

20. A method implemented by a system of one or more processors, the method comprising:
   setting one or more parameters associated with an eyeball control rig, the eyeball control rig comprising a representation of an eyeball, a plurality of light emitters, and one or more imaging devices, and the one or more parameters indicating, at least, an orientation associated with the eyeball replica;

obtaining a plurality of images of the eyeball replica, the images being low dynamic range (LDR) images obtained at different exposures;

generating a high dynamic range (HDR) image based on the obtained images; and causing a machine learning model to be trained based on at least one of the obtained images and the HDR image, wherein the machine learning model is trained to generate an HDR image from an input LDR image.

* * * * *